(12) United States Patent
Frantzen

(10) Patent No.: US 8,696,845 B2
(45) Date of Patent: *Apr. 15, 2014

(54) METHOD OF PROVIDING AN AIR PASSAGE IN A TIRE

(75) Inventor: Andreas Frantzen, Trier (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/333,430

(22) Filed: Dec. 21, 2011

(65) Prior Publication Data

US 2013/0160929 A1 Jun. 27, 2013

(51) Int. Cl.
*B29D 30/06* (2006.01)
*B60C 23/12* (2006.01)

(52) U.S. Cl.
USPC ........... 156/123; 152/415; 152/426; 156/133; 156/289; 156/719

(58) Field of Classification Search
USPC ......... 156/87, 110.1, 123, 133, 383; 152/415, 152/425, 426, 153; 425/37; 264/264, 130; 508/113, 148, 122; 106/38.24, 38.28
See application file for complete search history.

(56) References Cited

U.S. PATENT DOCUMENTS

| | | | | |
|---|---|---|---|---|
| 804,455 A | * | 11/1905 | Comstock | 508/122 |
| 2,574,719 A | * | 11/1951 | Teston | 106/38.24 |
| 3,962,103 A | * | 6/1976 | Johnston et al. | 508/122 |
| 3,967,968 A | * | 7/1976 | Stone et al. | 106/38.28 |
| 4,036,765 A | * | 7/1977 | Conger et al. | 508/143 |
| 4,039,143 A | * | 8/1977 | Brown et al. | 508/144 |
| 5,039,435 A | * | 8/1991 | Hanano | 106/38.24 |
| 5,294,251 A | * | 3/1994 | Urena | 106/271 |
| 5,468,401 A | * | 11/1995 | Lum et al. | 508/122 |
| 2007/0006951 A1 | * | 1/2007 | Summers | 152/153 |
| 2009/0294006 A1 | * | 12/2009 | Hrabal | 152/426 |
| 2011/0272073 A1 | | 11/2011 | Losey | |

OTHER PUBLICATIONS

Owen, M.J., "Release Agents", Encyclopedia of Polymer Science and Technology, vol. 4, pp. 115-124, 2001.*

* cited by examiner

*Primary Examiner* — Geoffrey L Knable
(74) *Attorney, Agent, or Firm* — John D. DeLong

(57) ABSTRACT

The present invention is directed to a method of constructing a tire, comprising:
  constructing a coated filament, the coated filament constructed by coating a filament with a coating material, the coating material comprising at least one substance dispersible in an uncured rubber compound;
  encasing the coated filament into containment within an uncured flexible tire component, the coated filament extending between an air inlet and an air outlet cavity in the pre-cured flexible tire component;
  building on a tire building drum a green tire carcass from uncured tire components including the uncured flexible tire component and encased coated filament;
  curing the green tire carcass into a cured finished tire including the flexible tire component containing the coated filament;
  removing the filament from the cured flexible tire component to leave within the flexible tire component a substantially unobstructed air passageway.

17 Claims, 41 Drawing Sheets

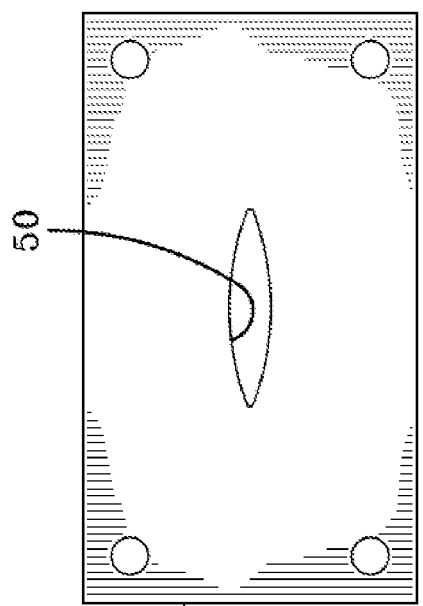
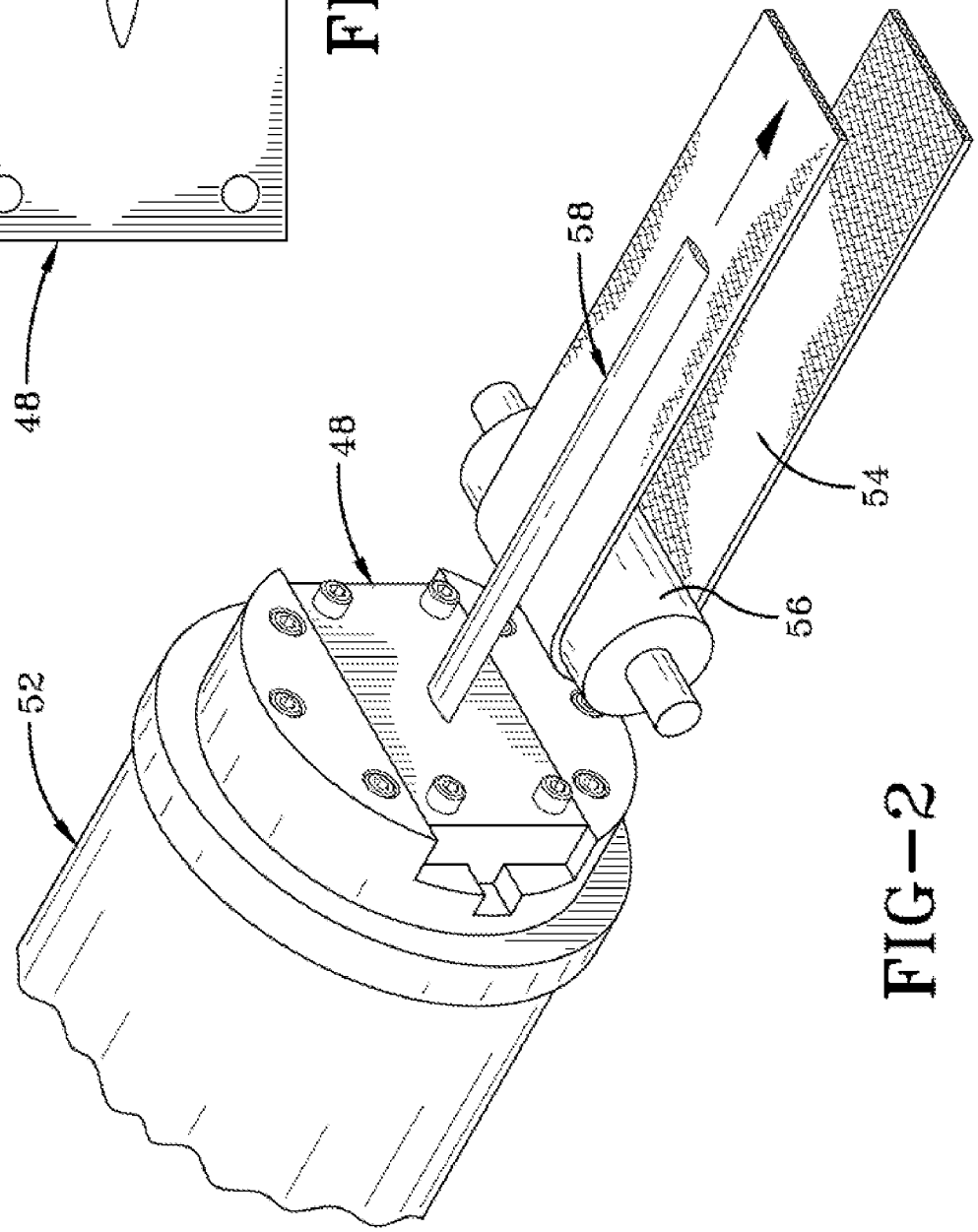

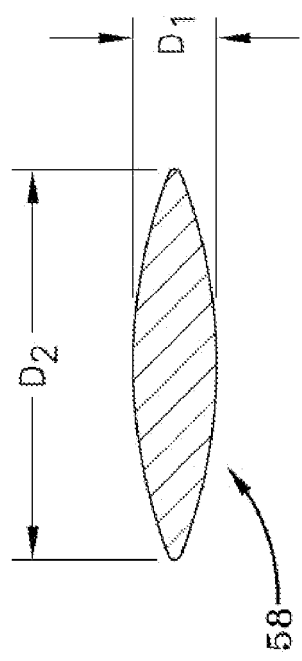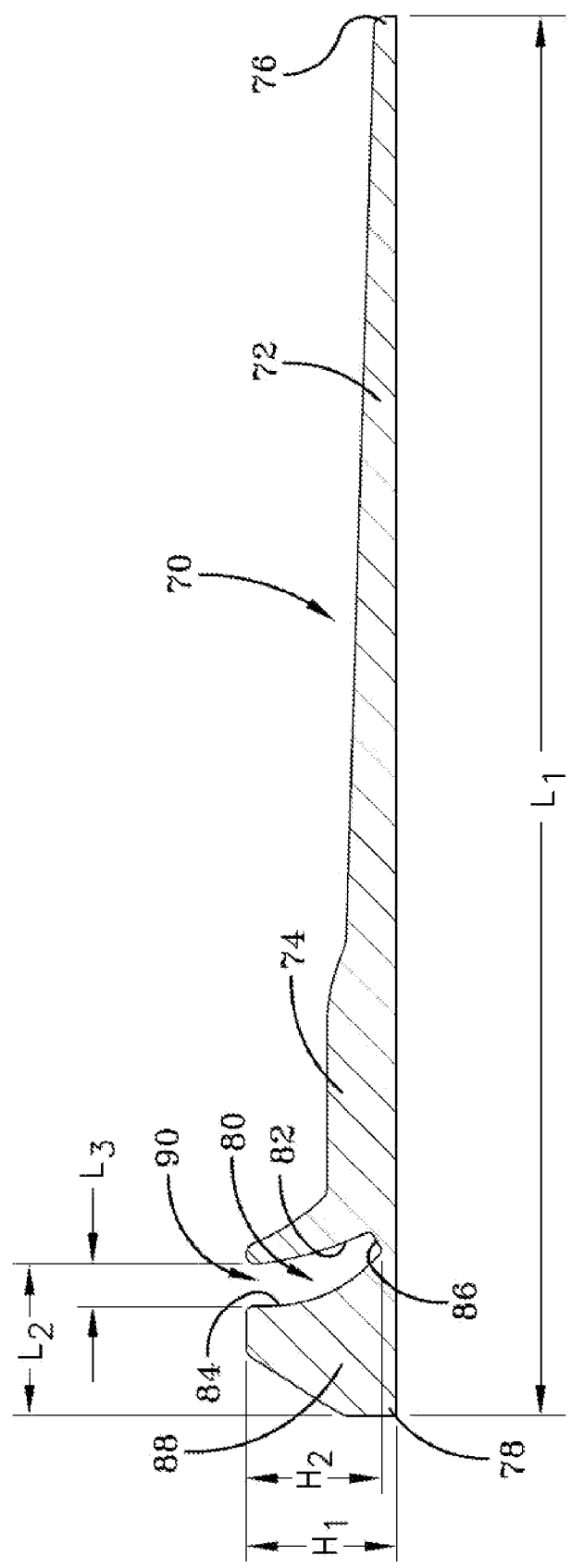

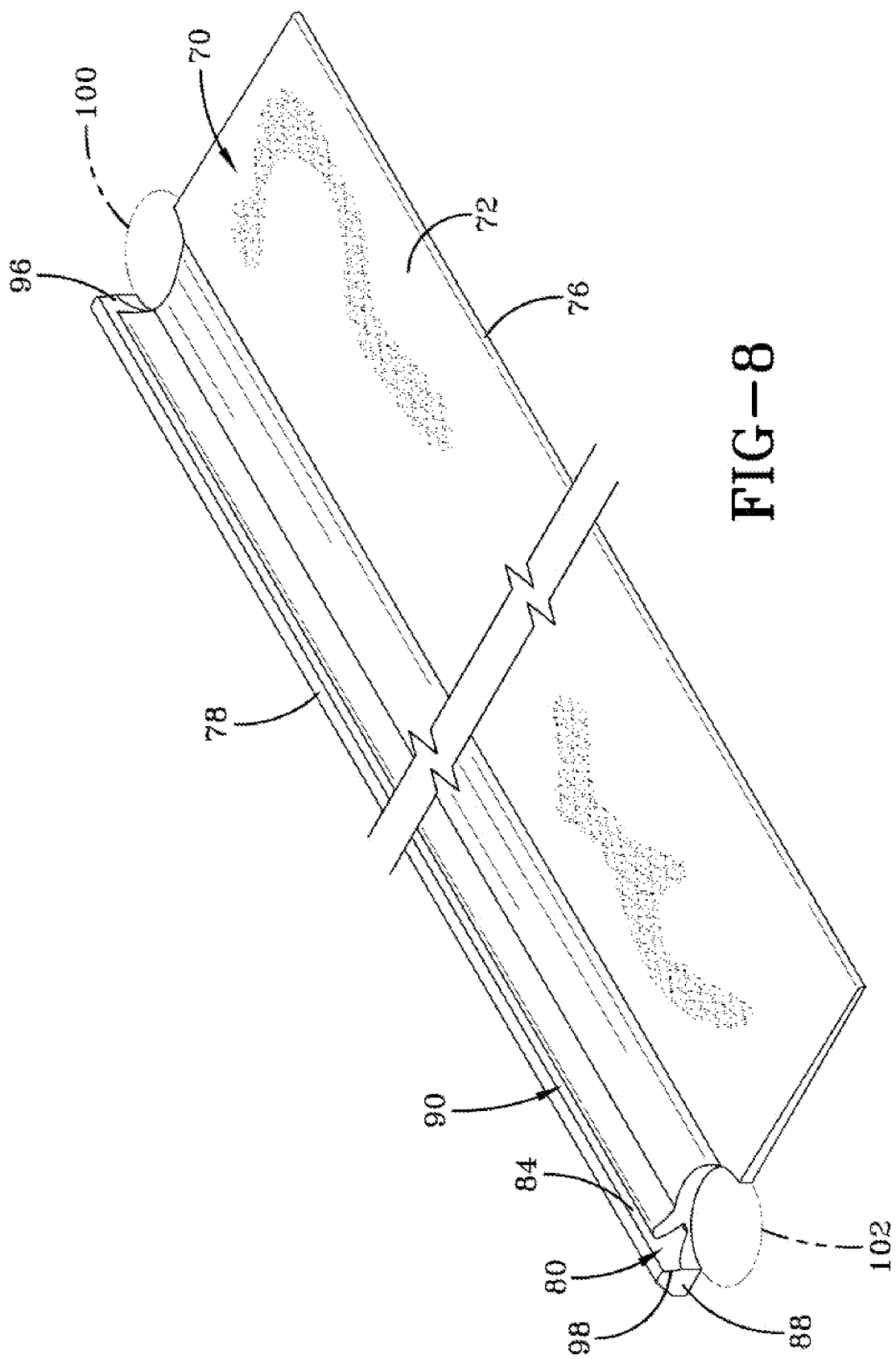

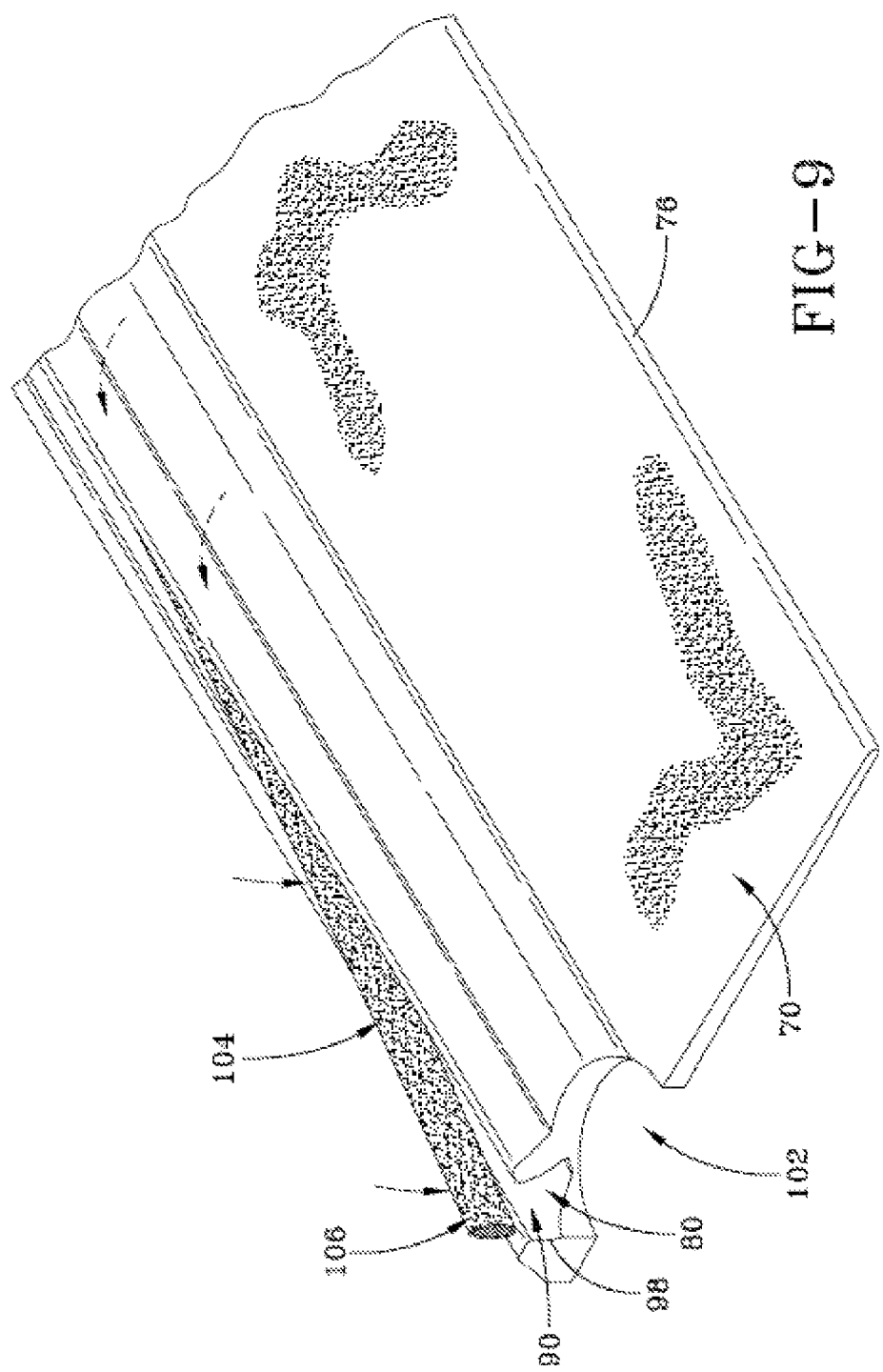

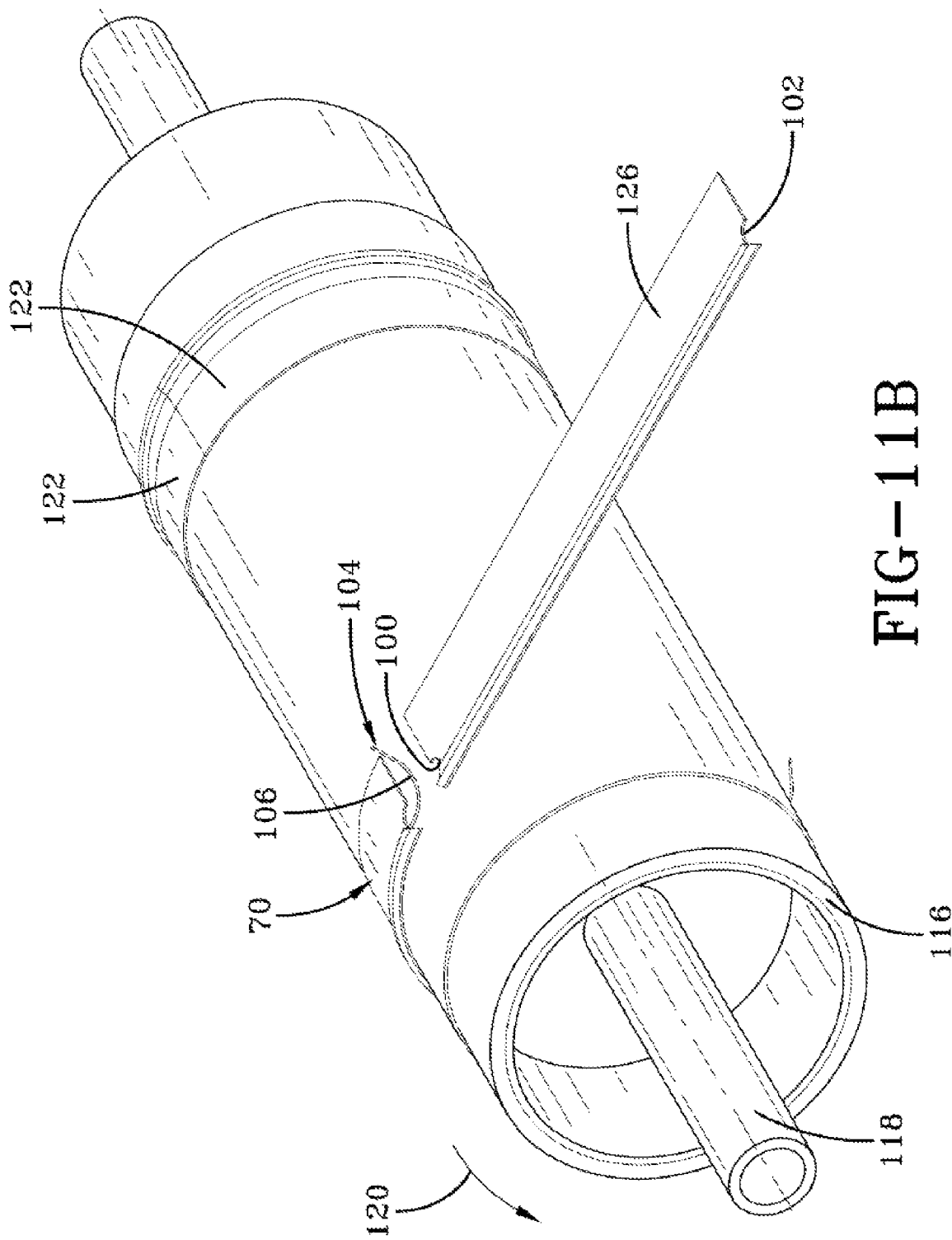

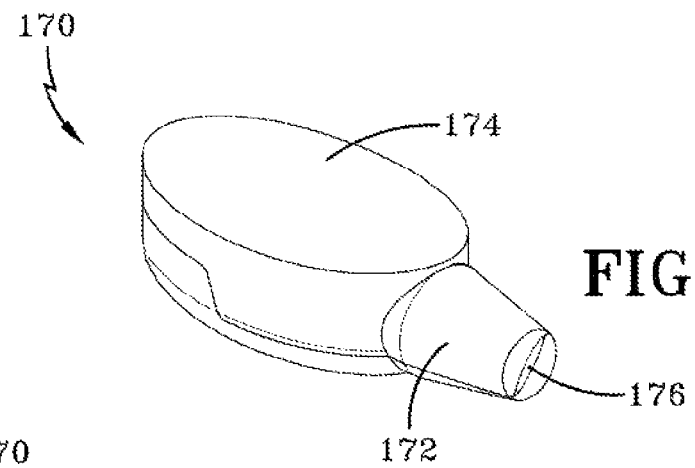
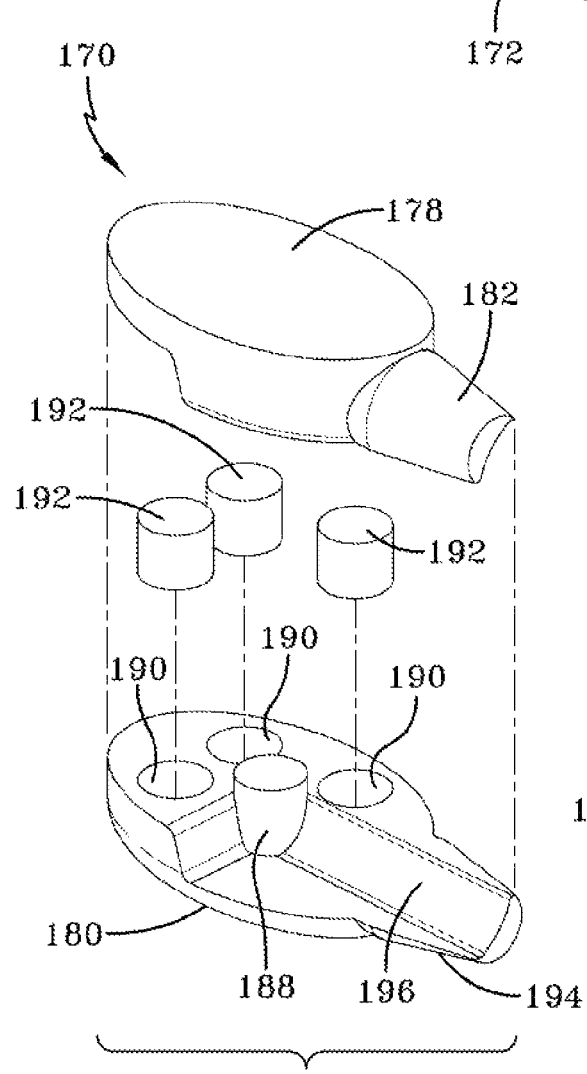
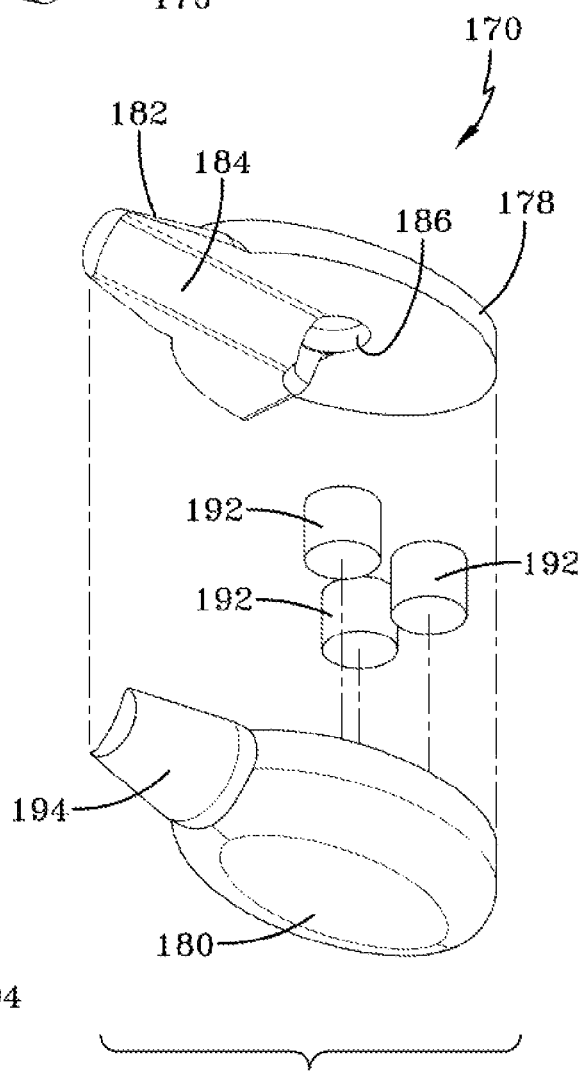
FIG-15A
FIG-15B
FIG-15C

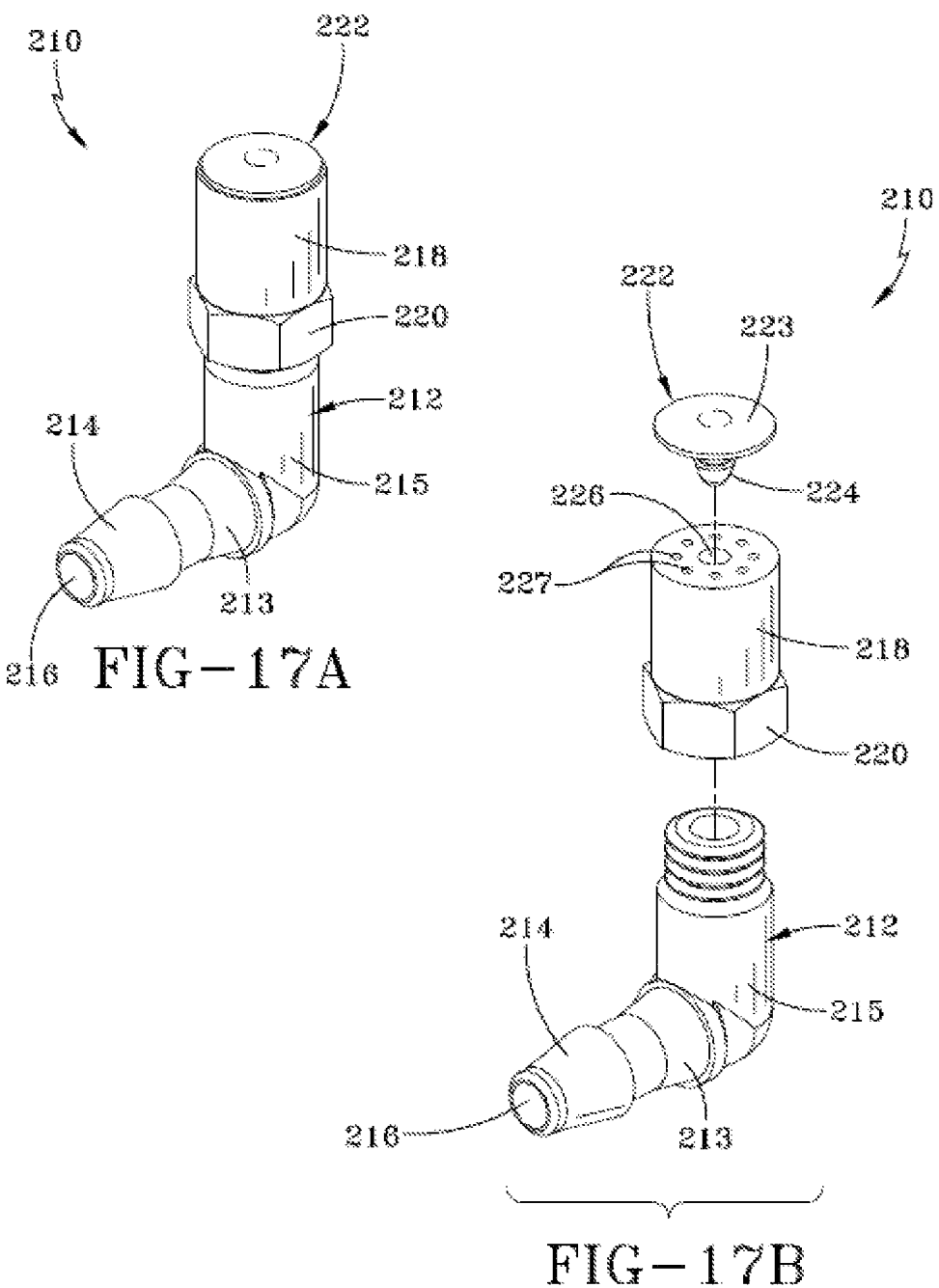

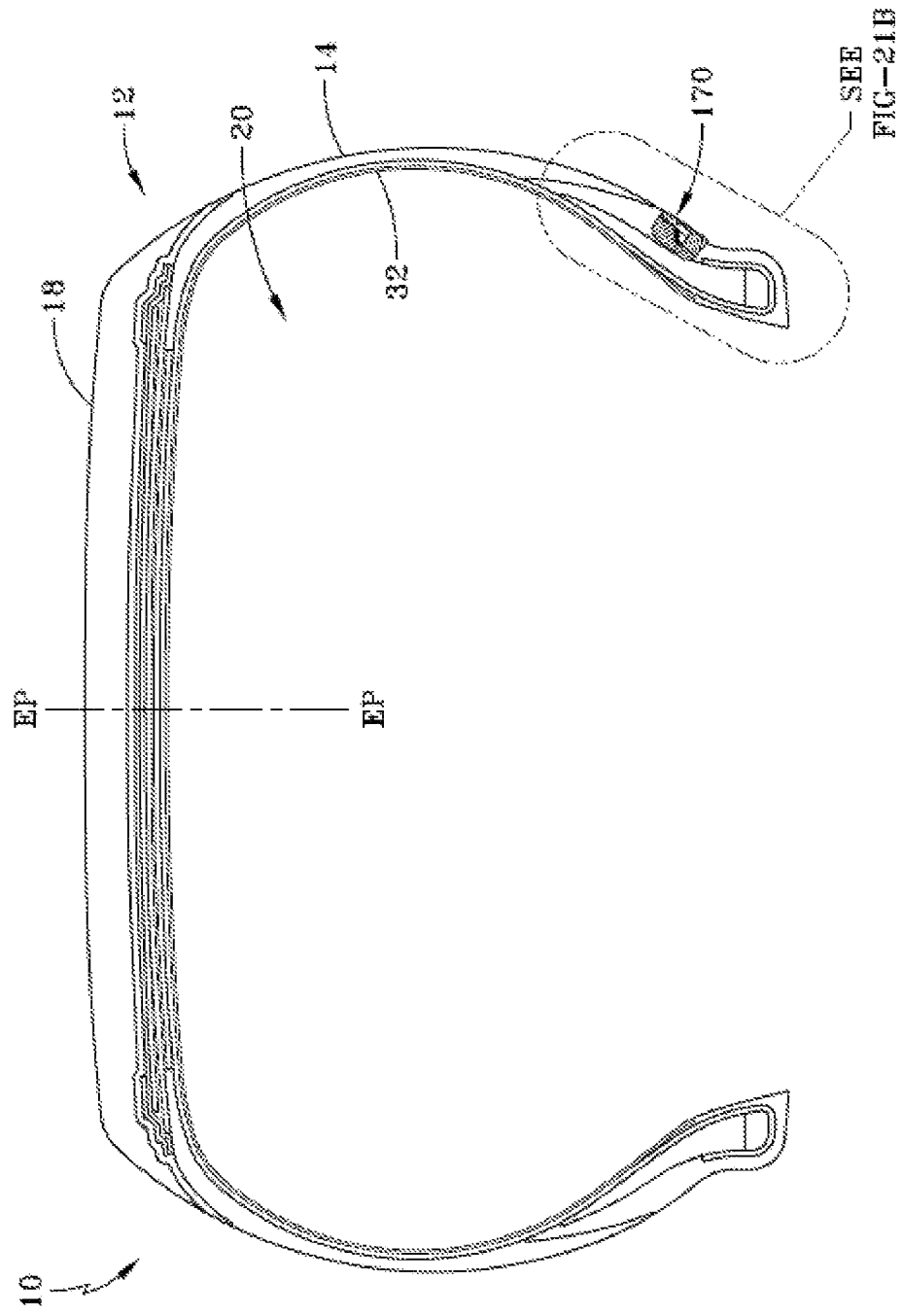

METHOD OF PROVIDING AN AIR PASSAGE IN A TIRE

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will re-inflate the tire in order to compensate for normal air diffusion over time without the need for driver intervention.

SUMMARY OF THE INVENTION

The present invention is directed to a method of constructing a tire, comprising:

constructing a coated filament, the coated filament constructed by coating a filament with a coating material, the coating material comprising at least one substance dispersible in an uncured rubber compound;

encasing the coated filament into containment within an uncured flexible tire component, the coated filament extending between an air inlet and an air outlet cavity in the pre-cured flexible tire component;

building on a tire building drum a green tire carcass from uncured tire components including the uncured flexible tire component and encased coated filament;

curing the green tire carcass into a cured finished tire including the flexible tire component containing the coated filament;

removing the filament from the cured flexible tire component to leave within the flexible tire component a substantially unobstructed air passageway.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A groove is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 1 is a detail view of the filament die.

FIG. 2 is a perspective view of a basic filament extruder and conveyor.

FIG. 5 is a dimensioned sectioned view of the filament.

FIG. 6 is a dimensioned sectioned view of extruded chafer strip.

FIG. 8 is a detail view of the chafer strip with punched hole locations.

FIG. 9 is an enlarged perspective view of the coated filament being assembled into the chafer strip.

FIG. 11B is a perspective view of a tire build up drum with a normal 180 degree chafer strip being placed abutting the 180 degree filament/chafer strip.

FIG. 15A is a top perspective view of a first embodiment inlet core assembly.

FIG. 15B is a top exploded view of the inlet core assembly showing top/bottom core halves and magnetic inserts.

FIG. 15C is a bottom exploded view of FIG. 15B.

FIG. 17A shows an alternative embodiment of threaded elbow and one-way valve assembly.

FIG. 17B is an exploded view of FIG. 17A showing the elbow valve housing with air passage ways and membrane cover.

FIG. 21A is a section view taken from FIG. 20 showing the inlet core location.

DETAILED DESCRIPTION OF THE INVENTION

There is disclosed a method of constructing a tire, comprising:

constructing a coated filament, the coated filament constructed by coating a filament with a coating material, the coating material comprising at least one substance dispersible in an uncured rubber compound;

encasing the coated filament into containment within an uncured flexible tire component, the coated filament extending between an air inlet and an air outlet cavity in the pre-cured flexible tire component;

building on a tire building drum a green tire carcass from uncured tire components including the uncured flexible tire component and encased coated filament;

curing the green tire carcass into a cured finished tire including the flexible tire component containing the coated filament;

removing the filament from the cured flexible tire component to leave within the flexible tire component a substantially unobstructed air passageway.

Figure 3:
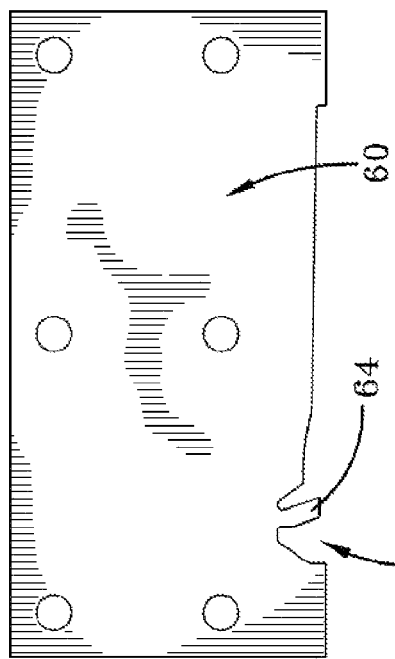
FIG. 3 is a detail of a chafer die.
Figure 4:
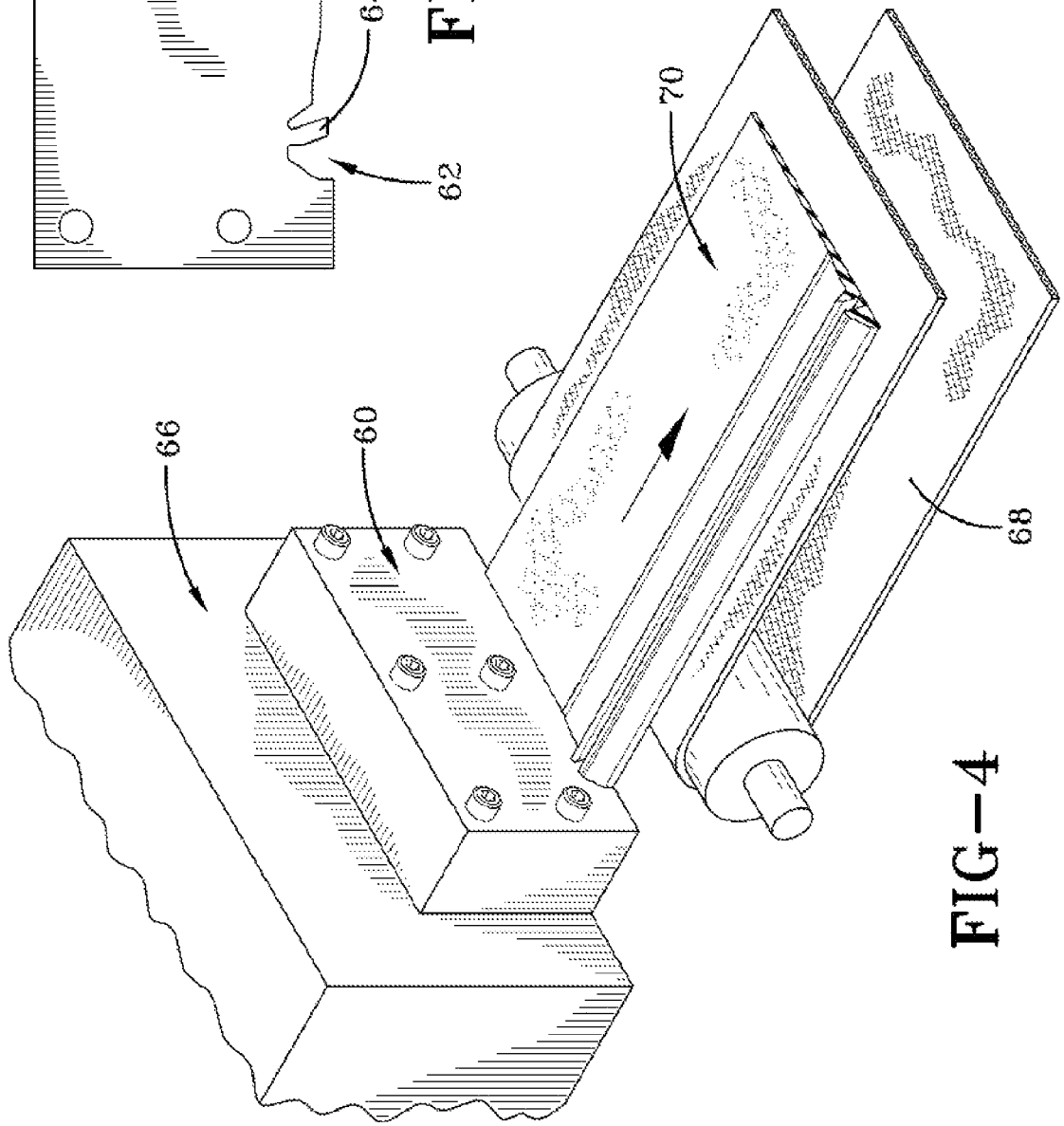
FIG. 4 is a perspective view of a basic chafer strip extruder and conveyor.

With reference to FIGS. 1, 2, 3, 4, 5 and 6, a polymer filament 58 is formed by means of die 48 having a profiled orifice 50 therethrough. The orifice is elongate and generally lens shaped in section with the extruded strip 58 of like sectional geometry. The lens shape may have a dimension of, by way of example without limitation intent, 2.7 mm length D2×0.5 mm at D1. While the preferred composition of the strip 58 is a polymer, other materials such as cable may be used if desired. The die 48 is affixed to a basic extruder of conventional configuration and deposits a formed filament 58 on a conveyer belt moved by drive roller 56. The filament 58 may be wound on a spool (not shown) for further processing and will be shown. As shown in FIGS. 3 and 4, a chafer strip 70 is formed by extrusion die 60 affixed to extruder 66 and deposited on roller 68. The die 60 is formed having along a chafer forming opening 62 along a bottom side and a downward projection finger 64 projecting into the opening 62. FIG. 6 shows a sectioned view of the extruded chafer strip. As seen, the strip 70 widens in section from a low width or thinner end region 72 to a stepped wider or thicker region 74 to a wider or thicker opposite region 88. The die finger 64 forms an incut, arching chafer channel or tube 80 extending the length of the chafer strip, defined by channel sidewalls 82, 84 and bottom wall 86. The channel is open initially as shown at 90. The chafer strip dimensions may be varied to suit the particular tire sizing needs and the tire construction characteristics desired.

Figure 7A:
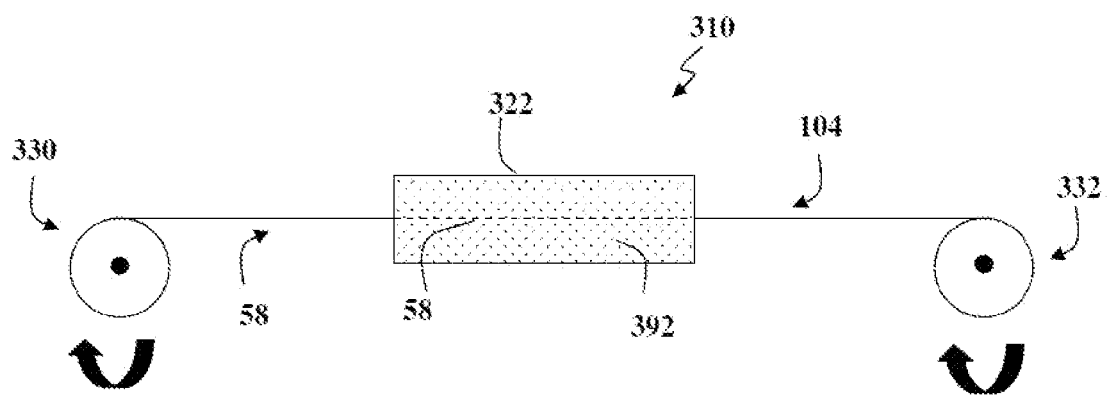
FIG. 7A is a schematic representation of a process to dip the filament in a coating material.

A flexible tire component, such as a chafer segment, is provided with a groove 80, as best seen in section from FIG. 6, is defined by groove lips 82, 84 that angle inwardly from top to bottom to a bottom groove wall 86. The groove 80, formed within an axially outward thicker side 88 of the chafer strip is accordingly open at groove opening 90. The groove 80 formed within the chafer as a result angles axially outward from the opening 90 to the bottom wall 86 at an acute angle θ. As shown in FIG. 7A, coated filament 104 is constructed with filament 58 enveloped within coating 92 formed of a material as will be described later. The coated filament 104, as explained following, will be used to form peristaltic tube within a green tire during green tire construction.

Figure 7B:
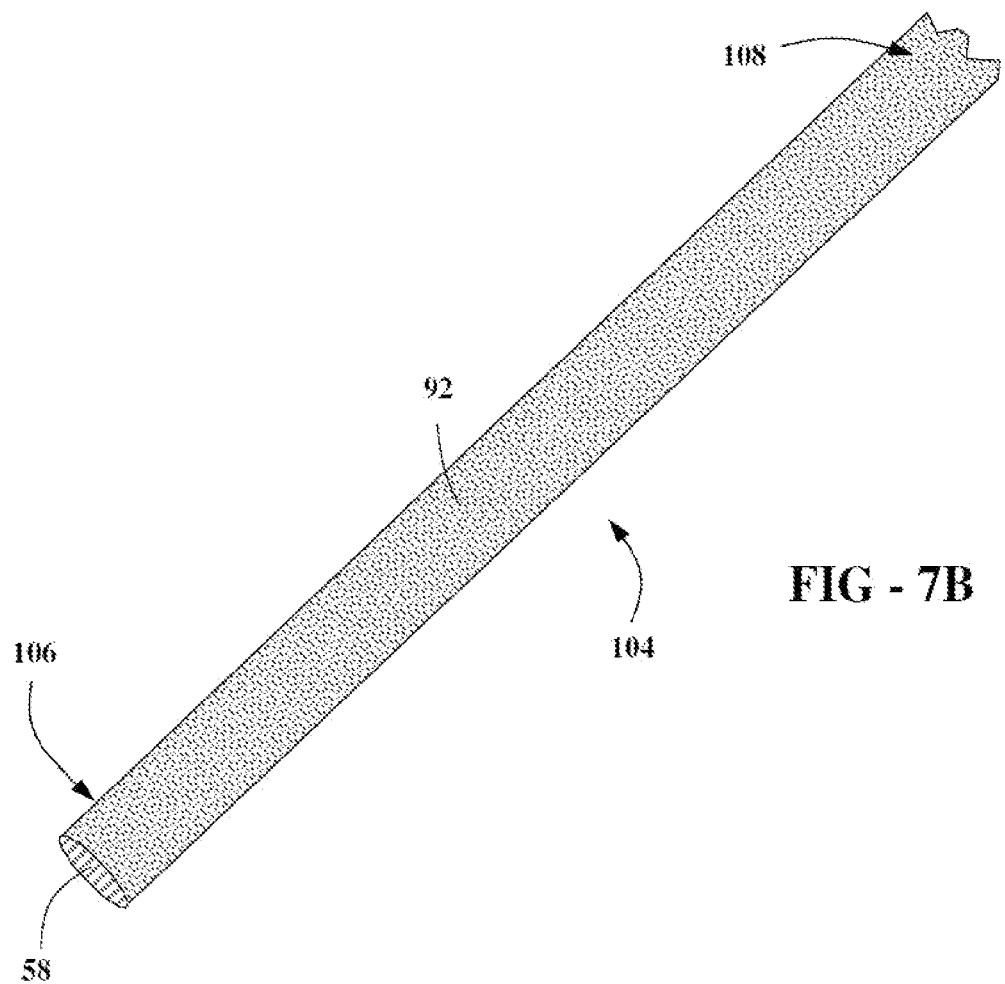
FIG. 7B is a perspective of the coated filament.

As shown in FIGS. 7A and 7B, the filament 58 is treated with a coating 92 to facilitate pull out from the chafer, as will be shown. As seen in FIG. 7A, the coating material 92 is disposed on the outer surface of the filament 58 by dipping the filament 58 in the coating material liquid 392. With reference now to FIG. 7A, one embodiment of a method of coating a filament according to the present invention is illustrated, wherein liquid coating material 392 is held in a dip bath 322. Liquid coating material 392 is in liquid form, either as a solution or a melt. Filament 58 is unwound from spool 330 and conveyed through dip bath 322 and liquid coating material 392 for deposition of liquid coating material 392 onto the surface of filament 58. Cooling or drying means (not shown) may be included after dip bath 322 to facilitate drying and/or solidification of the liquid coating material 392 after deposition, resulting in coated filament 104 having coating material 92 on the outside of filament 58. Coated filament 104 exits dip bath 322 and is wound onto spool 32 for storage after any cooling or drying (not shown).

The general purpose of coated filament 104 is to form within a green tire component, such as chafer 28, a core air passageway which, once the filament is removed, forms a peristaltic tube integrally within and enclosed by the tire component. The angled groove 80 is formed within the chafer strip as a slot, with the lips 82, 84 in a close opposed relationship. The groove 80 is then opened to receive the coated filament 104 by an elastic spreading apart of groove lips 82, 84. Thereafter, the coated filament 104 is positioned downward into the groove 80 until reaching a position adjacent to the bottom wall 86. A release of the lips 82, 84 causes the lips to elastic resume their close opposed original orientation. The lips 82, 84 are then stitched together in a rolling operation wherein a roller (not shown) presses the lips 82, 84 into the closed orientation shown in FIGS. 6 and 8 and become entrapped within the chafer strip by a folding over the chafer strip over the top as seen in FIG. 10C. The angle θ of the channel 80 with respect to a bottom surface of the chafer strip enables a complete capture of the coated filament 104 within the tire component, chafer 28, entirely surrounded by the chafer strip material composition.

Figure 10A:
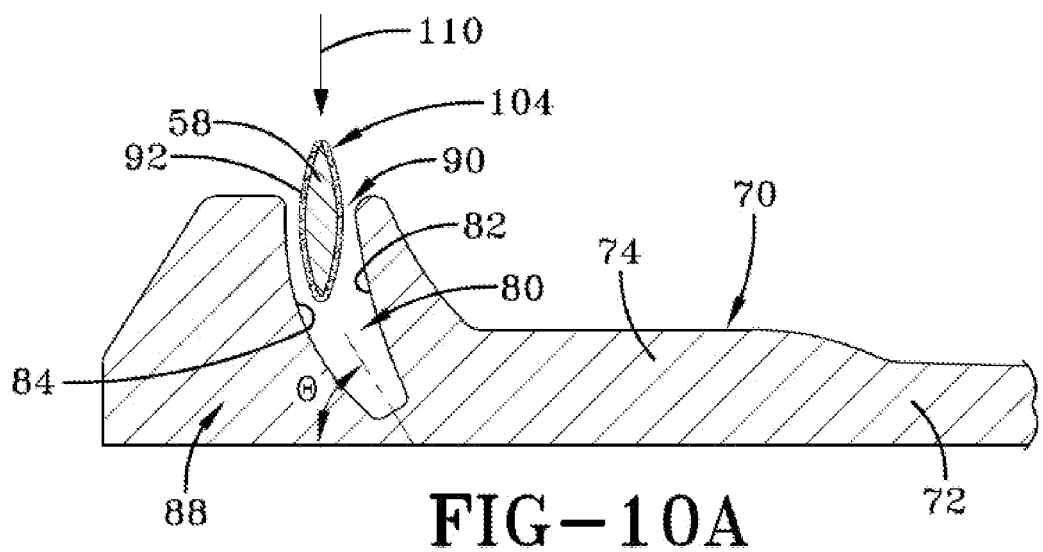
FIGS. 10A through 10C are sectioned views showing the coated filament and the chafer strip assembly.
Figure 10B:
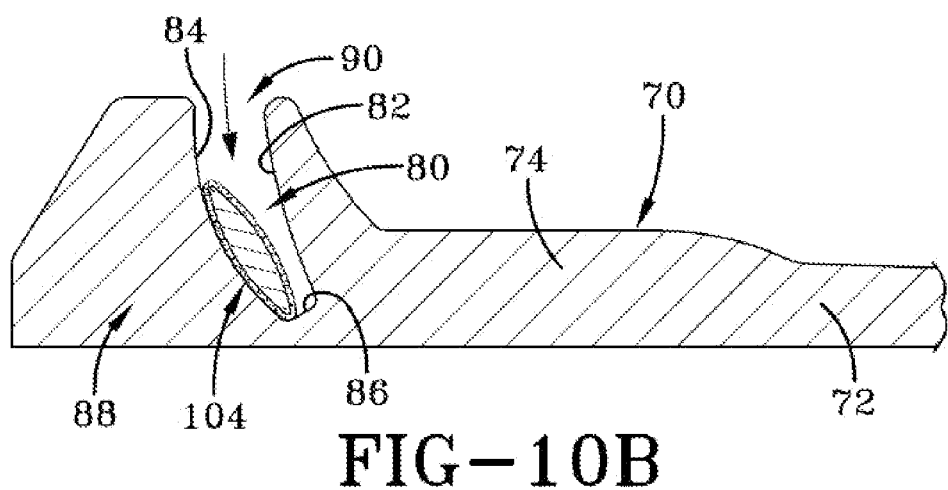
Figure 10C:
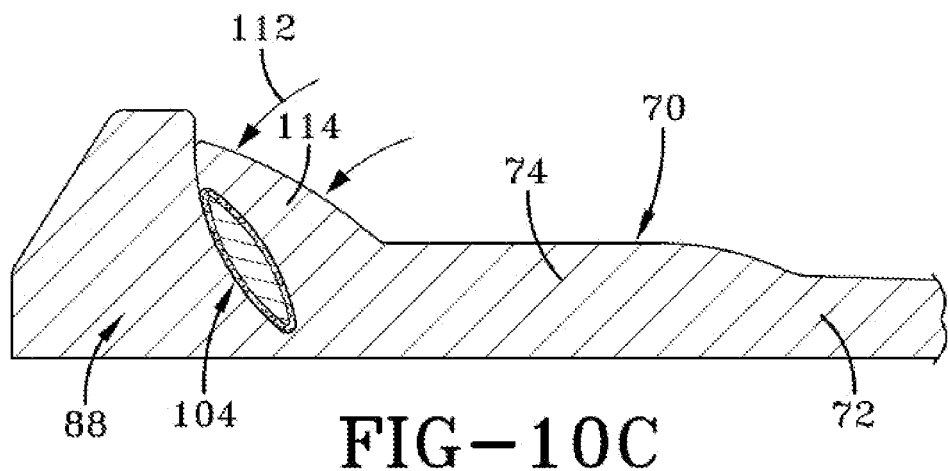

With reference to FIGS. 8, 9, 10A through 10C and 7B, the channel 80 is destined to become the tube component to a peristaltic pump assembly within the tire chafer 70 and generally extends from chafer strip end 96 to end 98. The chafer is cut at a given length depending on the pump length that is desired when the tire is cured. Formed within each end of the chafer by a punching operation or cutting operation are enlarged diameter circular holes 100, 102. The holes 100, 102 are adjacent the ends of the channel 80 and are sized to accommodate receipt of peristaltic pump inlet and outlet devices (not shown). The lips 82, 84 of the chafer channel 80 are pulled apart The coated filament 104 is inserted at direction arrow 110 into the channel 80 as shown in FIGS. 10A through 10C until adjacent and contacting the lower wall 86 of the channel 80. Thereupon, the coated filament 104 is enclosed by the chafer by a folding over of the chafer lip flap 82 in direction 112. The channel 80 is thus closed and subsequently stitched in the closed position by a pair of pressure contact rollers (not shown). So enclosed, the coated filament 104 will preserve the geometry of the channel 80 from green tire build until after tire cure when the coated filament 104 is removed. The coated filament 104 is dimensioned such that ends 106, 108 extend free from the chafer strip 70 and the chafer strip channel 80, and extend a distance beyond the punched holes 100, 102 at opposite ends of the chafer strip.

Figure 11A:
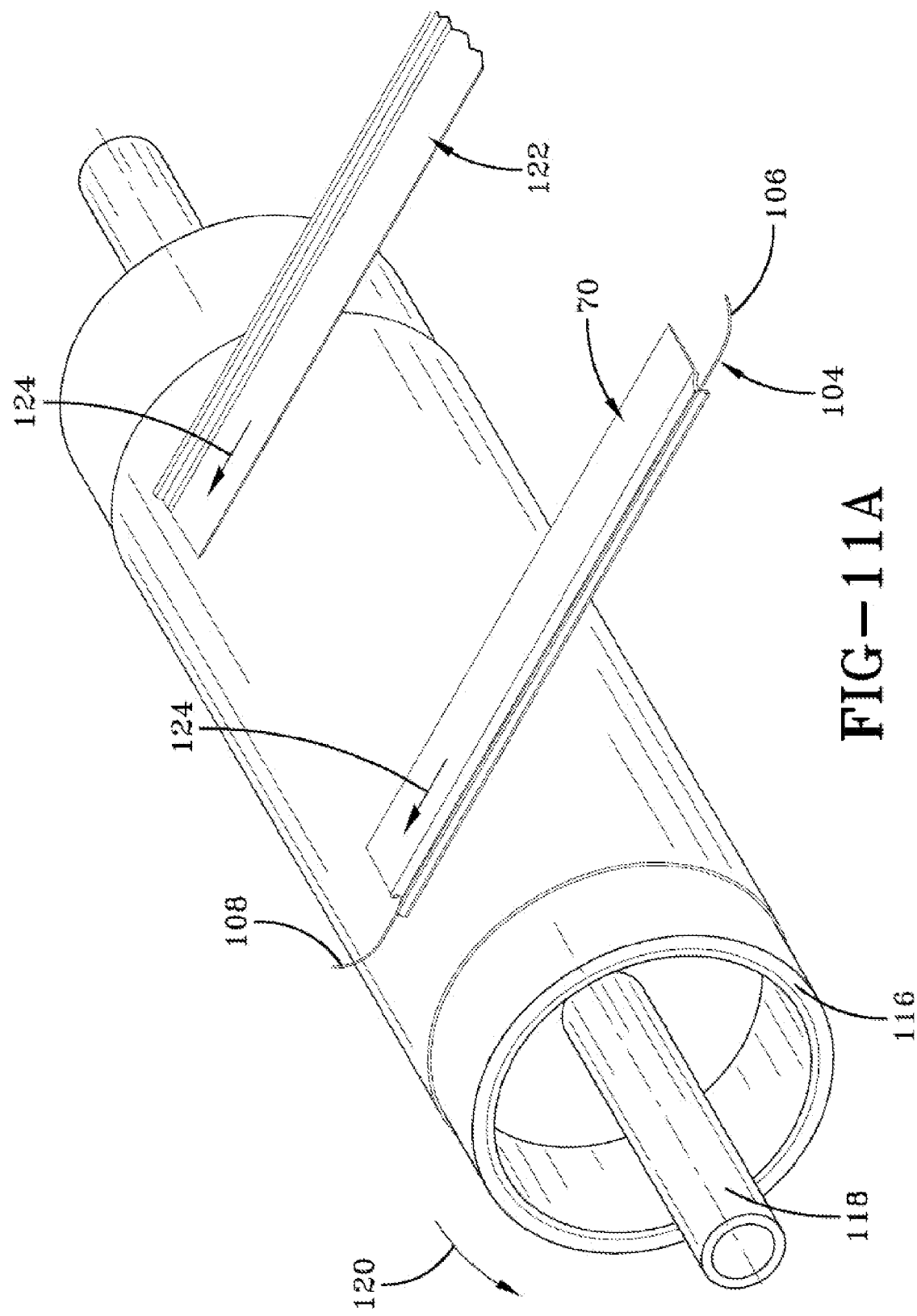
FIG. 11A is a perspective view of a tire build up drum with assembled 180 degree filament/chafer strip being applied, with a normal chafer strip placement on opposite ends.
Figure 12:
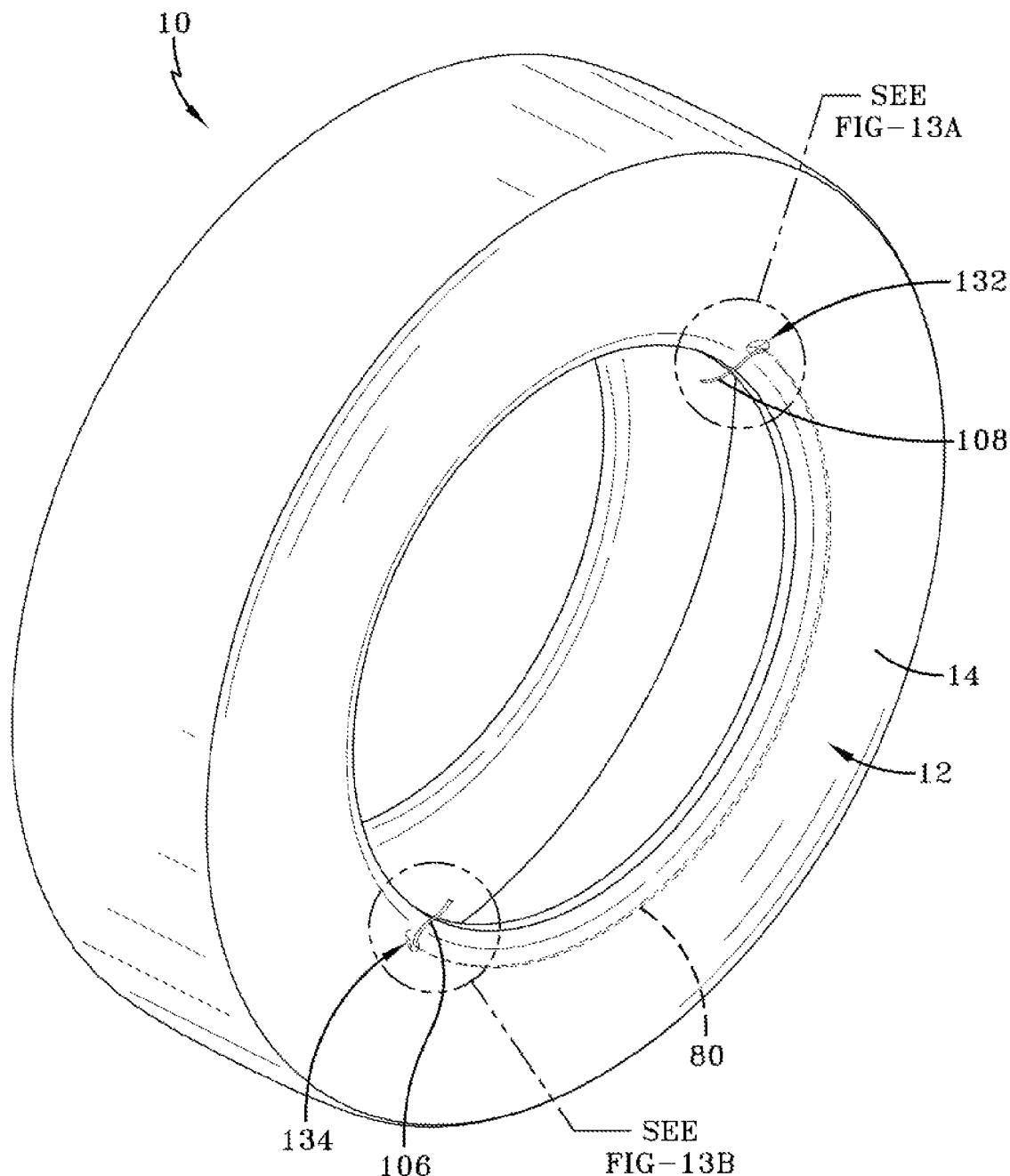
FIG. 12 is a perspective front view of a formed green tire showing inlet and outlet locations with the coated filament extending from openings and the tire ready for core forming devices.
Figure 13A:
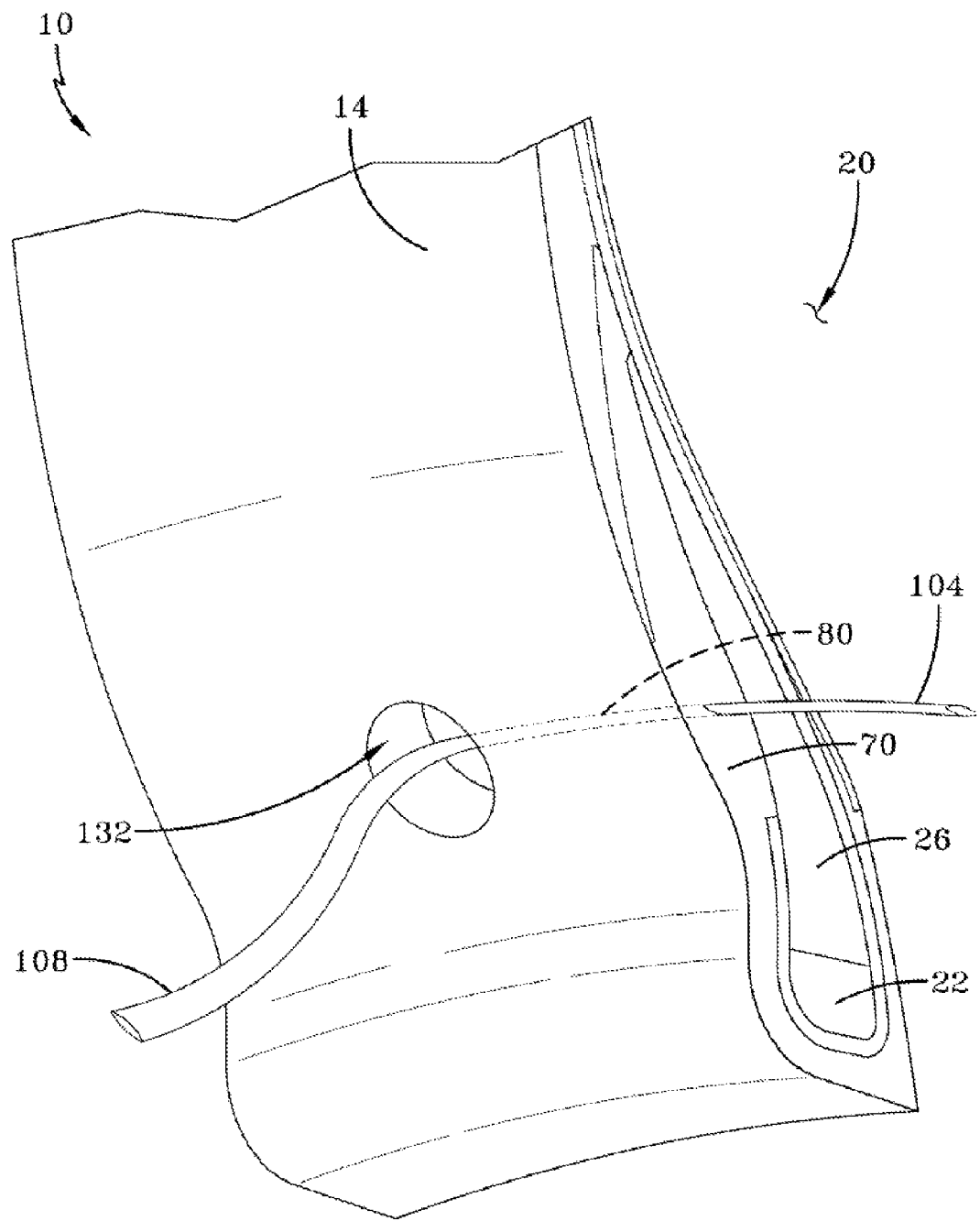
FIG. 13A is an enlarged sectioned view showing the inlet cavity and the coated filament ready for placement of the inlet core device.
Figure 13B:
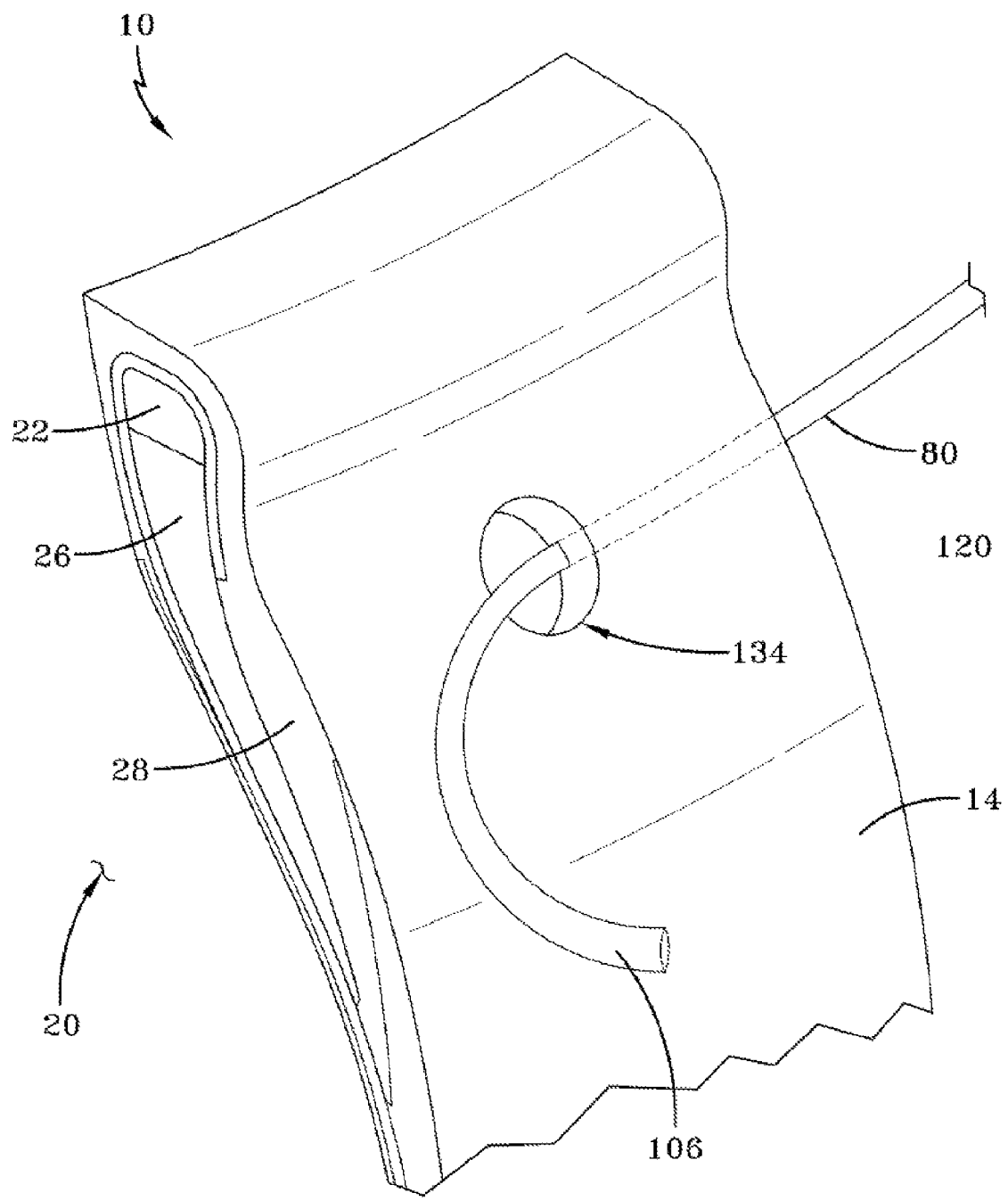
FIG. 13B is an enlarged sectioned view showing the outlet cavity and the coated filament ready for placement of the outlet core device.

Referring to FIGS. 11A, 11B and 12, a conventional green tire building station is depicted to include a build drum 116 rotational about an axial support 118. The chafer strip 70 containing coated filament 104 and an opposite chafer strip 122 that does not incorporate a coated filament 104 are positioned along opposite sides of the build drum 116 in direction 124 in an initial 180 degree chafer build-up. The chafer strip 70 is thus combined with a normal chafer strip 126 length to complete the circumference. The second strip 126 is applied to the building drum in alignment with and abutting strip 70 as shown in FIG. 11B to complete a 360 degree chafer construction on the drum. The opposite side of the drum receives two 180 degree normal strips 122 in abutment to complete the chafer build on that side. It will be noted that the chafer strip 70 contains the coated filament while the abutting strip 126 does not. However, if desired, both of the chafer strips 70, 126 as well as one or both of the strips 122 may be configured to contain a coated filament 104 to create a 360 degree peristaltic pump tube on one side or both sides of the green tire. For the purpose of explanation, the embodiment shown creates a pumping tube of 180 degree extent in one chafer component only. In FIG. 11B it will be noted that chafer strip 126 is configured to complement the construction of strip 70 shown in FIGS. 8 and 9. Circular punch holes 100, 102 are at opposite ends of the complementary strip 126. When abutted against the strip 70, the punch holes 100, 102 create 180 degree opposite cavities 132, 134 as seen in FIGS. 13A and 13B.

The free end 106 for the purpose of explanation will hereafter be referred to as the "outlet end portion" of the coated filament 104 extending through the outlet cavity 134; and the free end 108 the "inlet end portion" of the coated filament 104 extending through the circular inlet cavity 132. FIG. 12 illustrates the 180 degree extension of the coated filament 104 and FIGS. 13A, 13B show the relative location of the coated filament 104 to the lower tire bead and apex components. FIG. 13A shows the inlet cavity 132 and coated filament 104 ready for placement of a temporary inlet core device and FIG. 13B shows the outlet cavity 134 ready for placement of a temporary outlet core device.

Figure 14A:
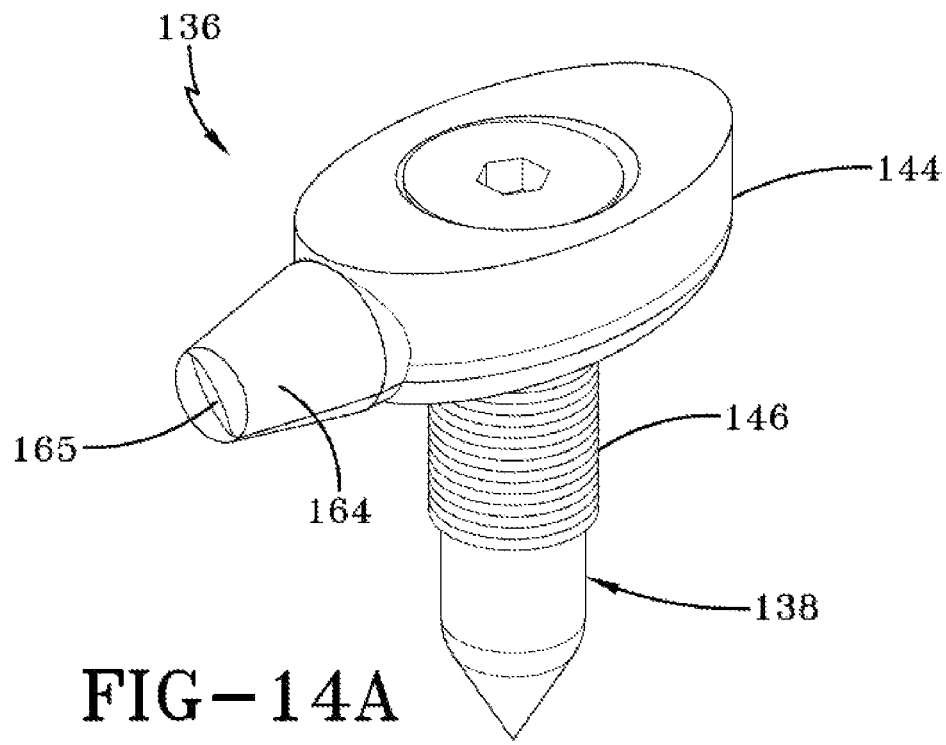
FIG. 14A is a top perspective view showing a first embodiment outlet core assembly with screw punch attached.
Figure 14B:
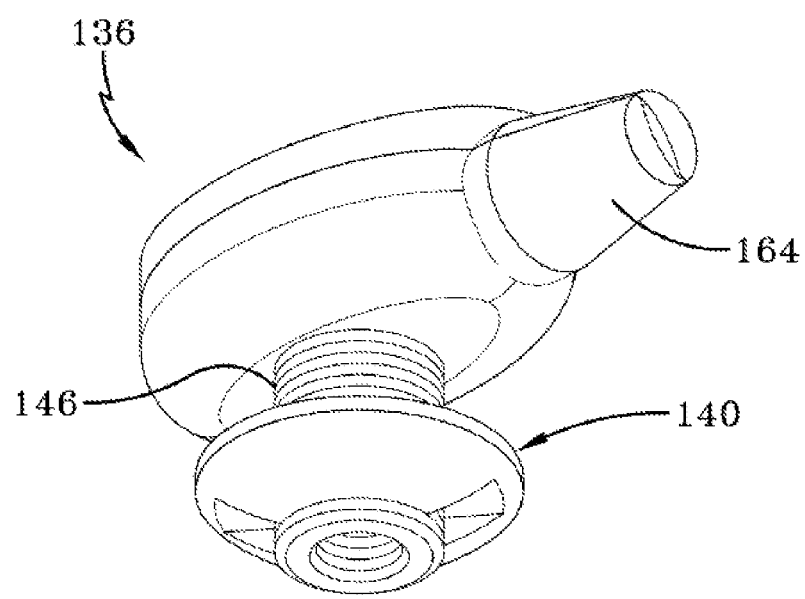
FIG. 14B is a bottom perspective view showing the outlet core assembly with screw punch removed and the nut attached.
Figure 14C:
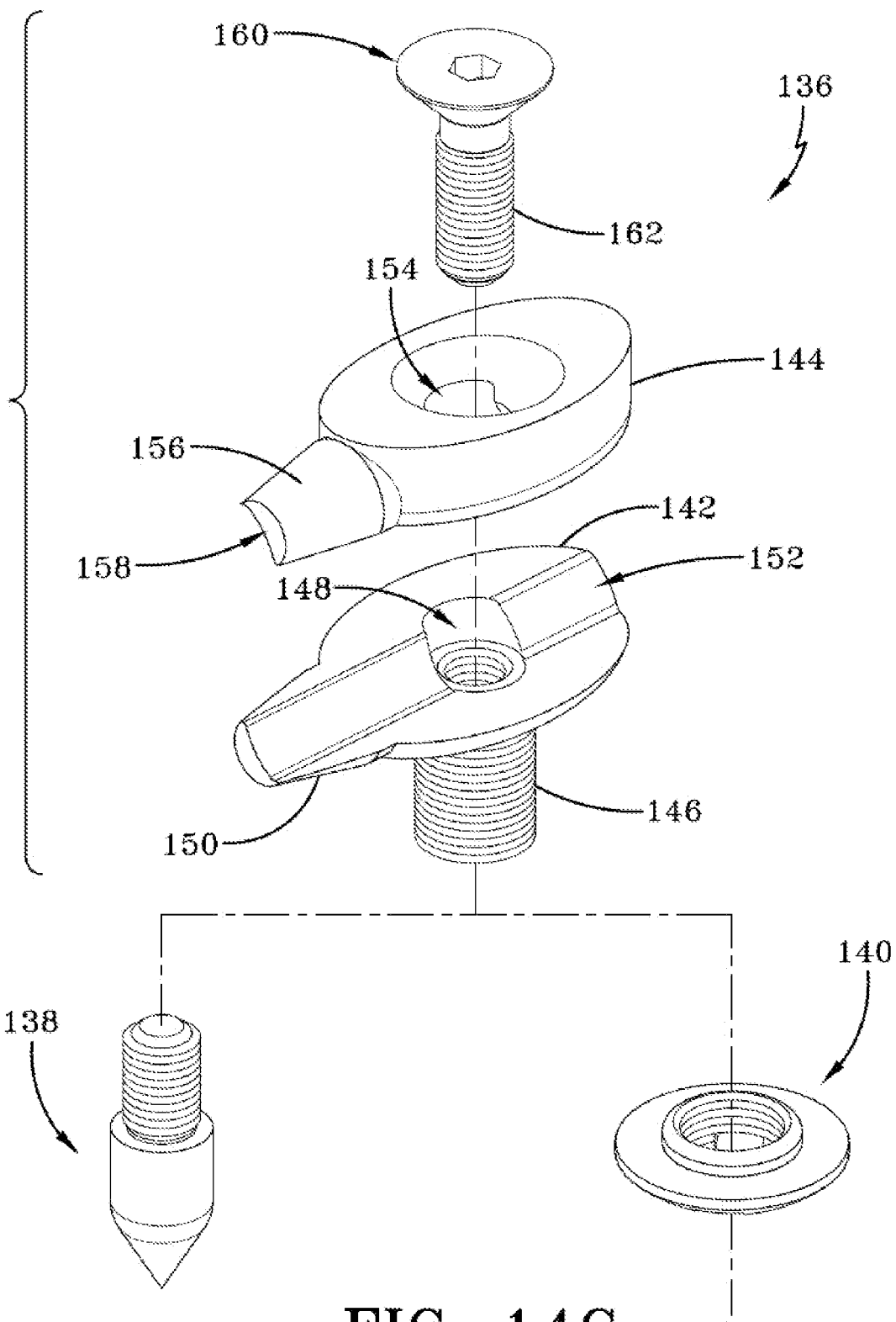
FIG. 14C is a top exploded view of the outlet core assembly showing top/bottom core halves and mounting screw with the screw punch and hold down nut.
Figure 14D:
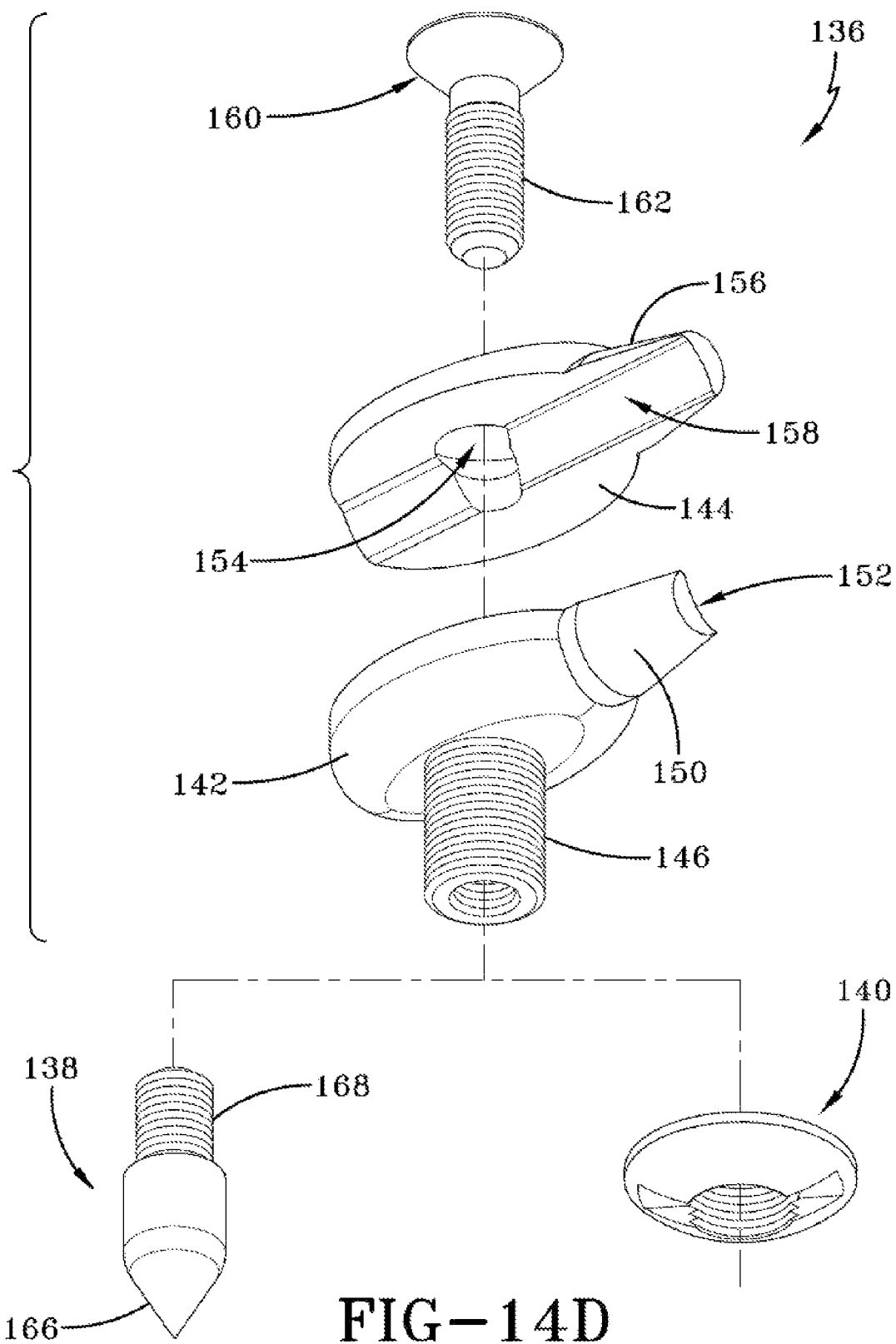
FIG. 14D is a bottom exploded view of FIG. 14C.

FIGS. 14A through 14D show a first embodiment of a pre-cure, temporary outlet core assembly 136 with attached screw punch 138 and replacement nut 140. The temporary outlet core assembly 136 includes mating bottom half-housing component 142 and a top half-housing component 144 connecting by means of a coupling screw 160. The bottom half-housing component 142 has a dependent cylindrical screw threaded sleeve 146; an upper socket 148 extending downward into the component 142 and communicating with the upward facing opening of sleeve 146; and a half-protrusion 150 having an axial half-channel formed to extend across housing 142. The top-half-housing component 144 has a central through bore 154, a half-protrusion housing 156 and a half-channel formed to extend side to side across an underside of the housing 144. United as shown in FIGS. 14A and 14B, the two half-housing components 142, 144 are assembled by screw 160 threading bolt 162 down through the bore 154 and into the sleeve 146. So assembled, the half-protrusion housings 150 and 156 unite as well as the half-channels 152, 158. In the assembled state, as seen in FIGS. 14A and 14B, the protrusion housings 150, 156 form an outwardly projecting conical tube-coupling protrusion 164 away from the combined housing halves 142, 144 and defining an axial air passageway channel 165 having a sectional shape and dimension corresponding with the coated filament 104 within chafer strip 126 of the tire.

The inwardly and outwardly threaded shaft 146 of the temporary outlet core assembly 136 receives and couples with an externally threaded shaft 168 of the screw punch accessory device 138. As will be explained below, screw punch device 138 will in the course of peristaltic tube assembly formation be replaced with the threaded collar or nut 140 as shown in FIG. 14B.

With reference to FIGS. 15A through 15C, a metallic first embodiment of a precure, temporary inlet core assembly 170 is shown forming a housing body 174 from which a conical coupling housing protrusion 172 extends. An axial air passageway through-channel 176 extends through the housing body 174 and the protrusion 172 having a sectional shape and dimension corresponding with the shape and dimensions of the coated filament 104 within the chafer strip 126 of the green tire. The housing body 175 is formed by a combination of half-housing 178, 180, each providing a half-coupling protrusion 182, 194, respectively in which a half-channel 184, 196 is formed, respectively. A central assembly socket 186 extends into the internal underside of half-body 178 and receives an upright post 188 from the lower half-body 180 to center and register the two half-bodies together. Three sockets 190 are formed within the lower half-body 180 with each socket receiving a magnetic insert 192. The magnets 192 operate to secure the metallic half-housings 178 and 180 together.

Figure 16A:
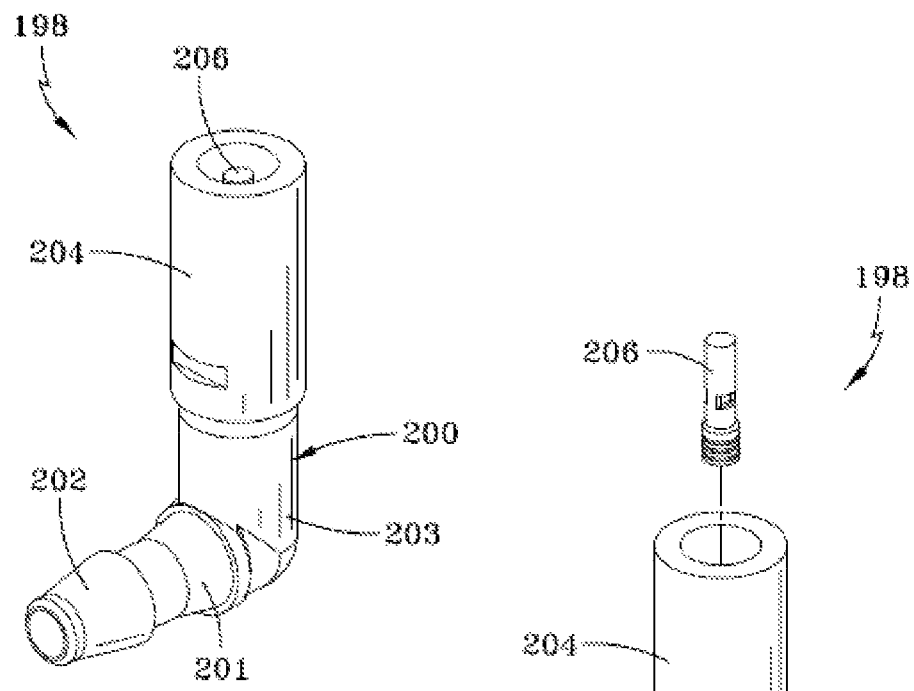
FIG. 16A is a threaded elbow and valve housing assembly.
Figure 16B:
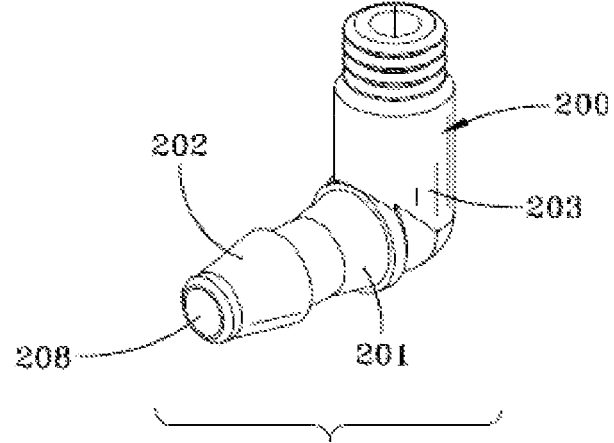
FIG. 16B is an exploded view of FIG. 16A showing the elbow, valve housing and Lee valve.

Referencing FIGS. 16A and 16B, a threaded elbow and valve housing assembly 198 is shown for use as a permanent outlet core valve assembly. The housing assembly 198 is formed of a suitable material such as a nylon resin. The assembly 198 includes an elbow housing 200 having a conical remote end 202 and a cylindrical valve housing 204 affixed to an opposite end. A one-way valve, such as a Lee valve, is housed within the valve housing 204. An axial air passageway 208 extends through the L-shaped assembly 198 and through the Lee valve seated in-line with the passageway. A Lee valve is a one-way valve which opens at a prescribed air pressure to allow air to pass and is commercially available from The Lee Company USA, located at Westbrook, Conn., USA.

FIGS. 17A and 17B show an alternative embodiment of an elbow connector and one-way post-cure outlet valve assembly 210. A L-shaped elbow connector housing 212 has a conical forward arm end 214 and an axial passageway 216 that extends through the L-shaped housing 212. An umbrella-type valve 218 of a type commercially available from Mini-Valve International located in Oldenzaal, The Netherlands, attaches to a threaded end of housing 212 by means of nut 220. The valve 218 has a circumferential array of air passages 227 that allow the passing of air from the housing of the valve.

The valve 218 includes an umbrella stop member 222 having a frustro-conical depending protrusion 224 that fits and locks within a valve central bore 226 and a flexible circular stop membrane 223. The protrusion 224 of stop member 222 locks into the axial bore 226. The flexible membrane 223 is in a closed or down position when air pressure on the membrane is at or greater than a prescribed pressure setting. In the down position, membrane 223 covers the apertures 227 of the valve body and prevents air from passing. The membrane 223 moves to an up or open position when the air pressure outside the membrane falls to a pressure less than the preset pressure setting. In the up or open position, air can flow from the apertures 227 into the tire cavity.

Figure 18A:
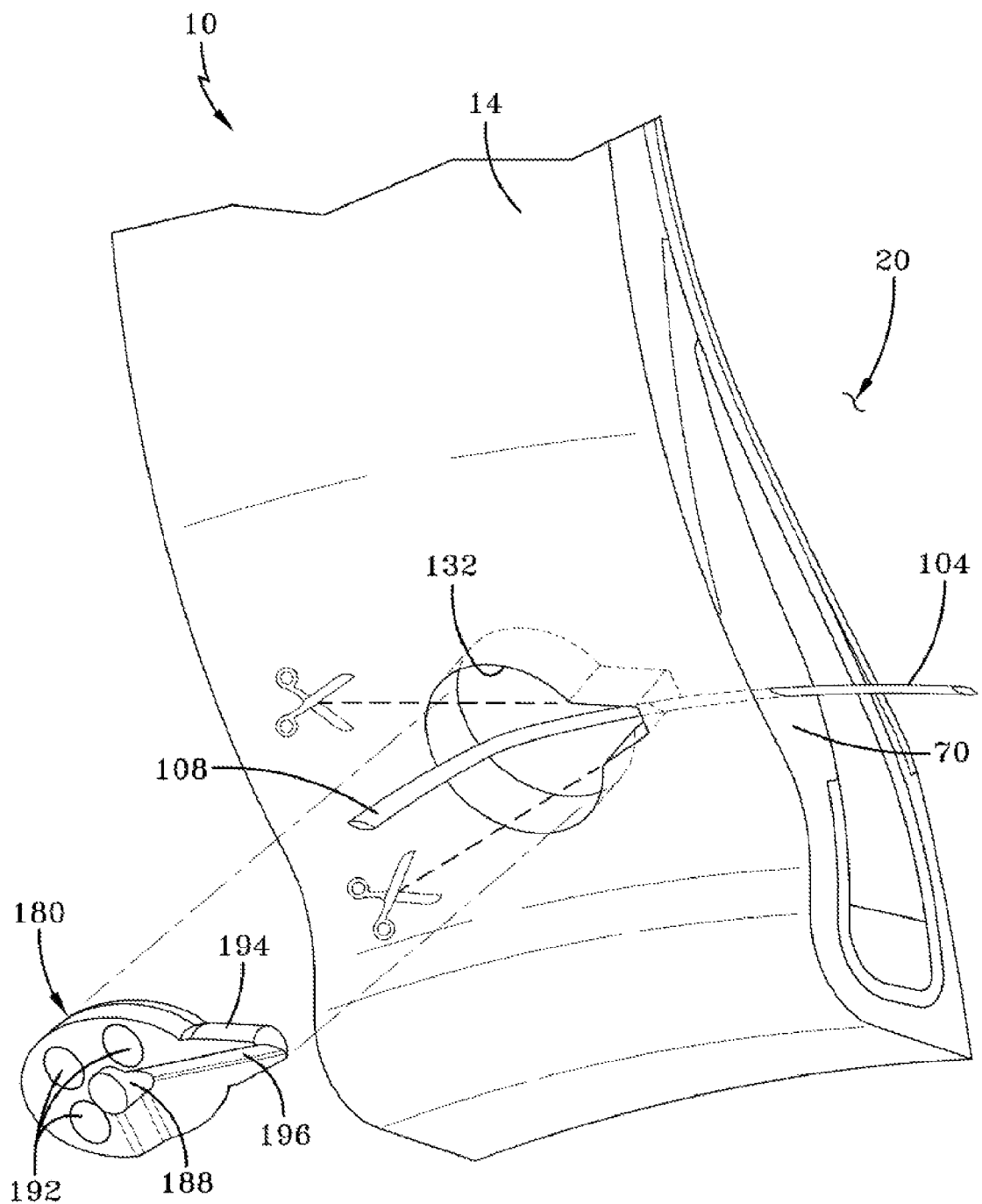
FIG. 18A is an enlarged sectioned view showing the inlet bottom core being inserted into the cavity under the coated filament and the chafer groove re-opened to allow room of the conical end of the inlet core to be fully seated into cavity.
Figure 18B:
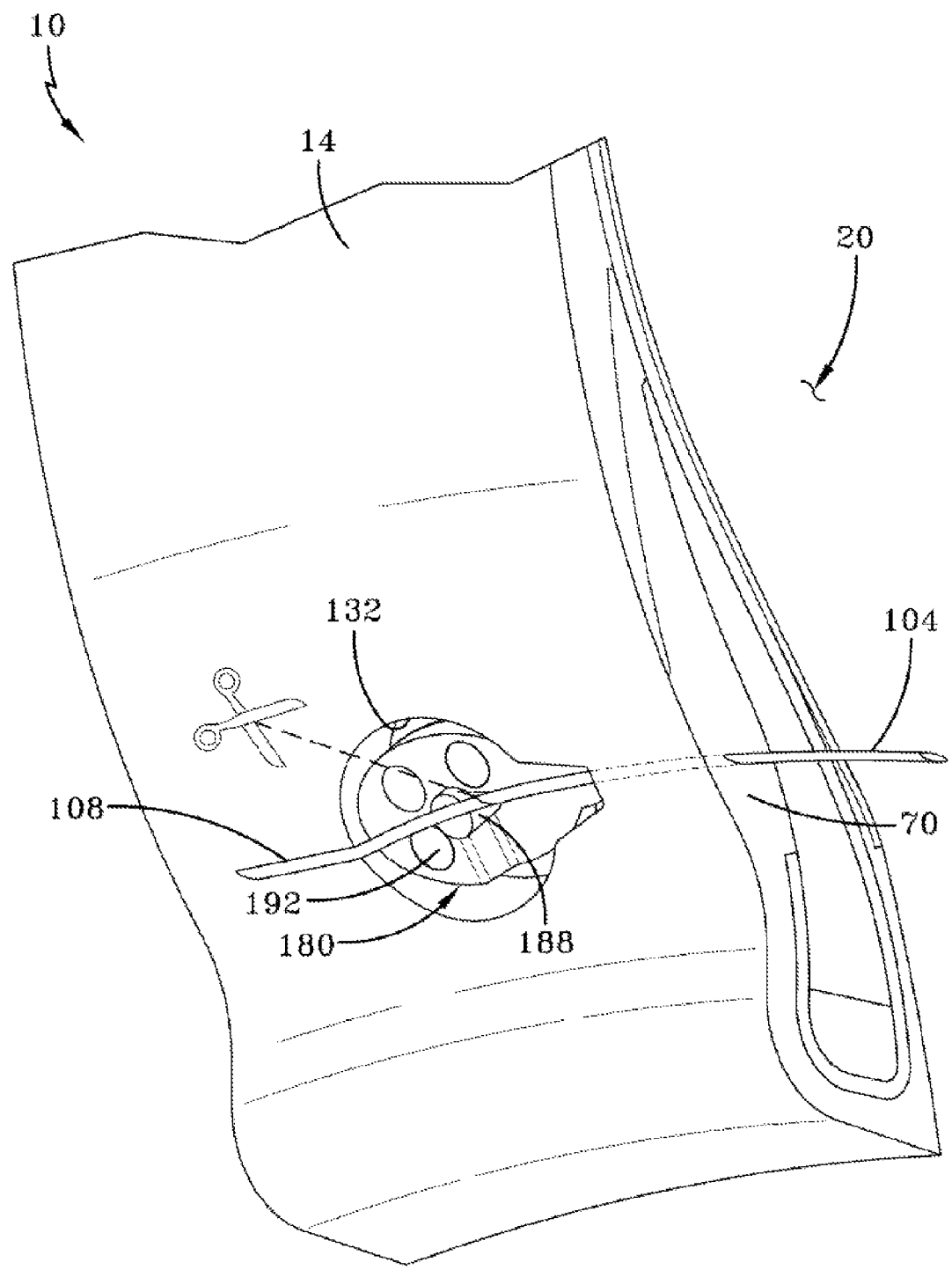
FIG. 18B is an enlarged sectioned view showing the inlet bottom core fully inserted into the cavity and the coated filament being trimmed to length.
Figure 18C:
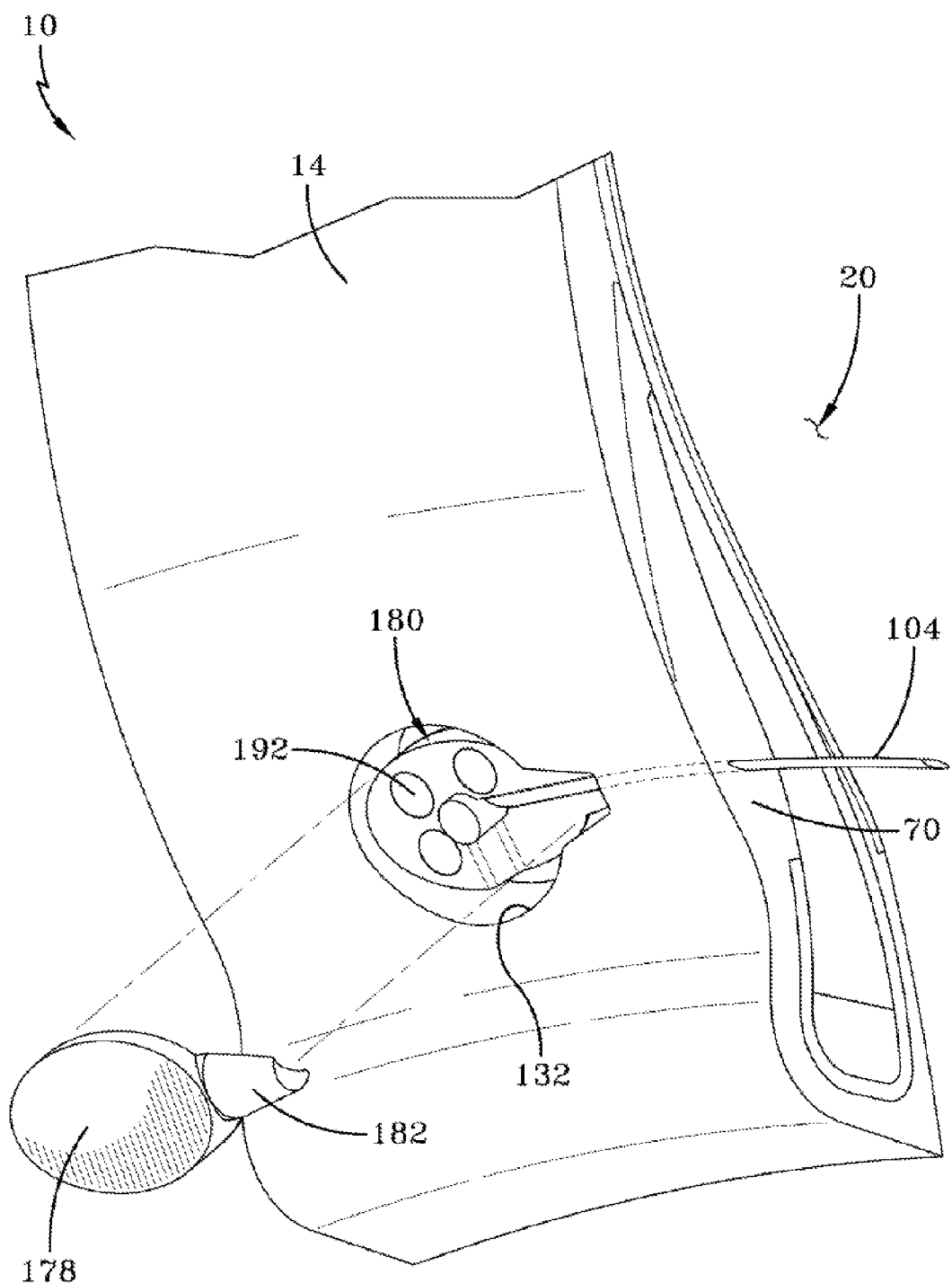
FIG. 18C is an enlarged sectioned view showing the inlet top core ready for placement into the cavity.
Figure 18D:
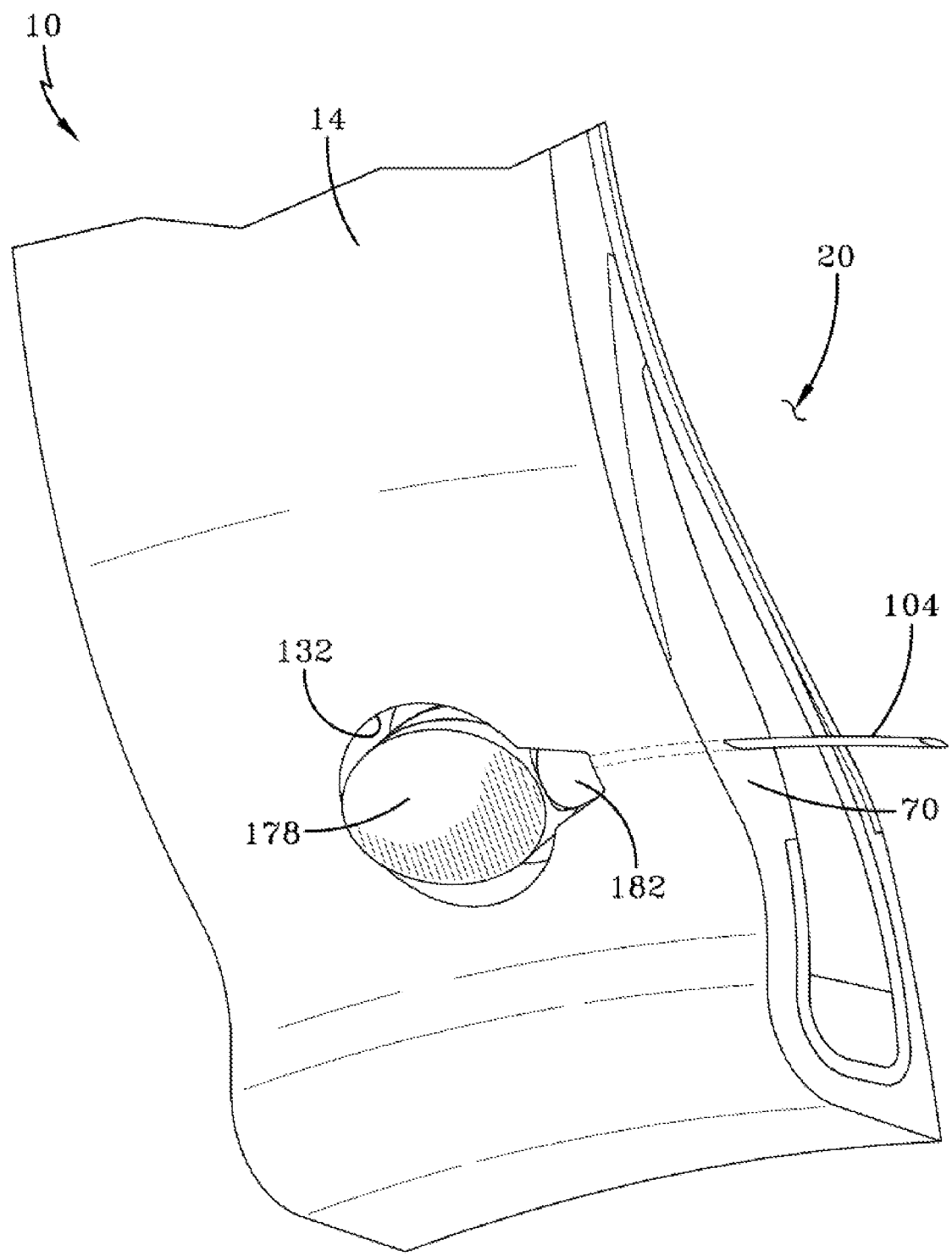
FIG. 18D is an enlarged section view showing the inlet core assembly fully assembled into cavity.
Figure 18E:
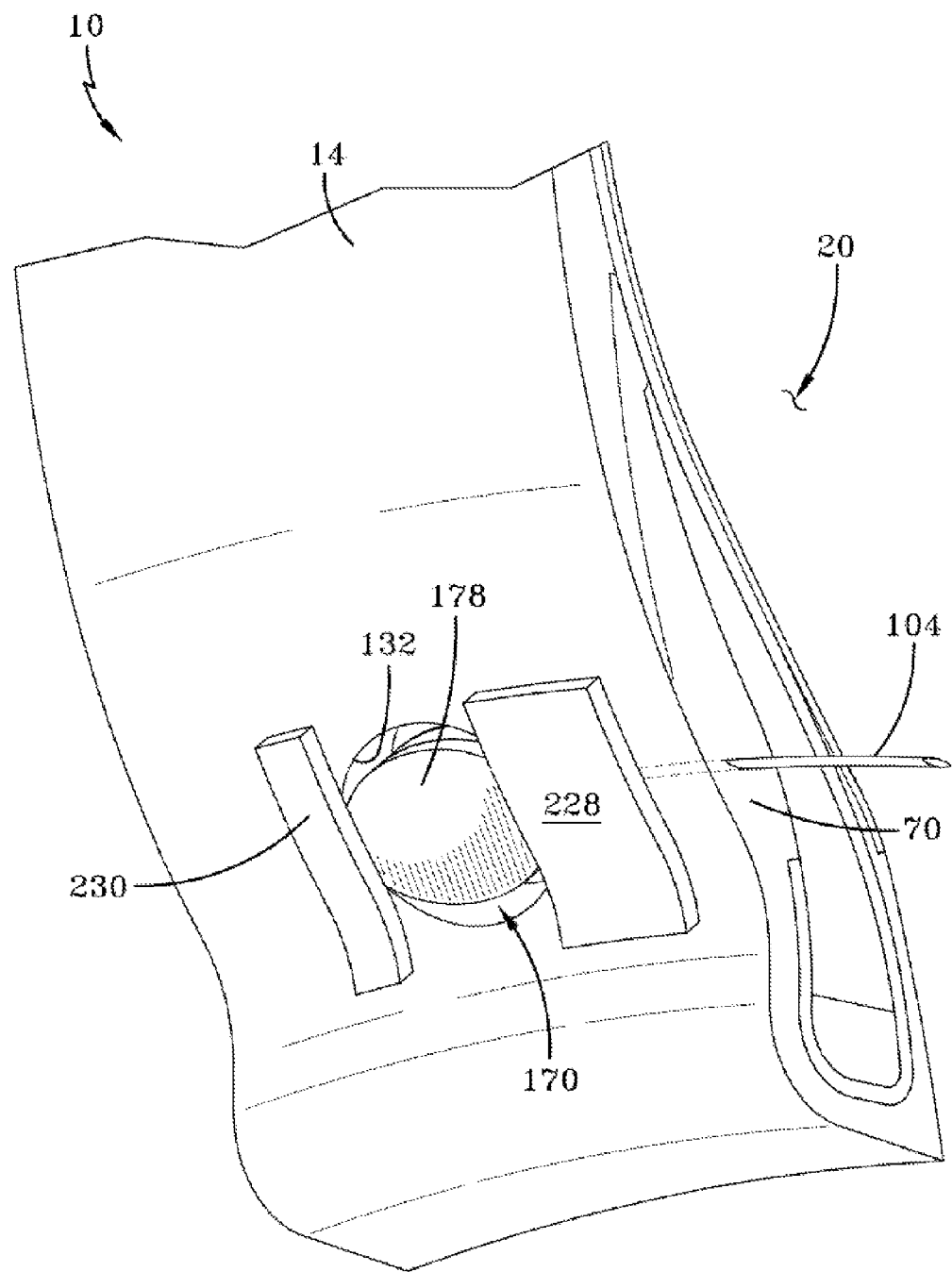
FIG. 18E is an enlarged section view showing the inlet core assembly held in place with thin rubber patches is ready for curing.

FIGS. 18A through 18D represent sequential views showing the installation of the inlet core assembly embodiment of FIGS. 15A through 15C connecting into the green tire coated filament 104 after green tire build and prior to curing of the green tire. In FIG. 18A, the bottom half housing component 180 is inserted into the inlet cavity 132 after the cavity 132 has been enlarged into generally a key shape as indicated by the scissor representation. The cutting implement opens the chafer strip groove, still occupied by coated filament 104, to accommodate receipt of the conical half-protrusion 194 of half-housing 180. The tapered end of conical half-protrusion 194 fits into the chafer channel occupied by coated filament 104 as shown in FIG. 18B, as the coated filament 104 is position within the half-channel 196 across the housing 180. The extra length of inlet end portion 108 is cut and removed, whereby positioning a terminal end of the coated filament 104 within the housing component 180. The upper, outer, top half-housing component 178 is thereupon assembled over the housing component 180, as seen in FIG. 18D, capturing the coated filament 104 within the channel formed by upper and lower half-channels 184, 196. The magnets 192 secure the metallic half-housings 178, 180 together. Rubber patches 228, 230 as seen in FIG. 18D are applied over the temporary inlet core assembly 170 to secure the assembly in place for the tire cure cycle. The hollow metallic housings 178, 180 are held together by the magnets. It will be appreciated that a non-metallic hollow housing may be employed if desired, such as a hollow housing made of molded plastic, with housing components held together by locking detent techniques known in the plastic casing art.

Figure 19A:
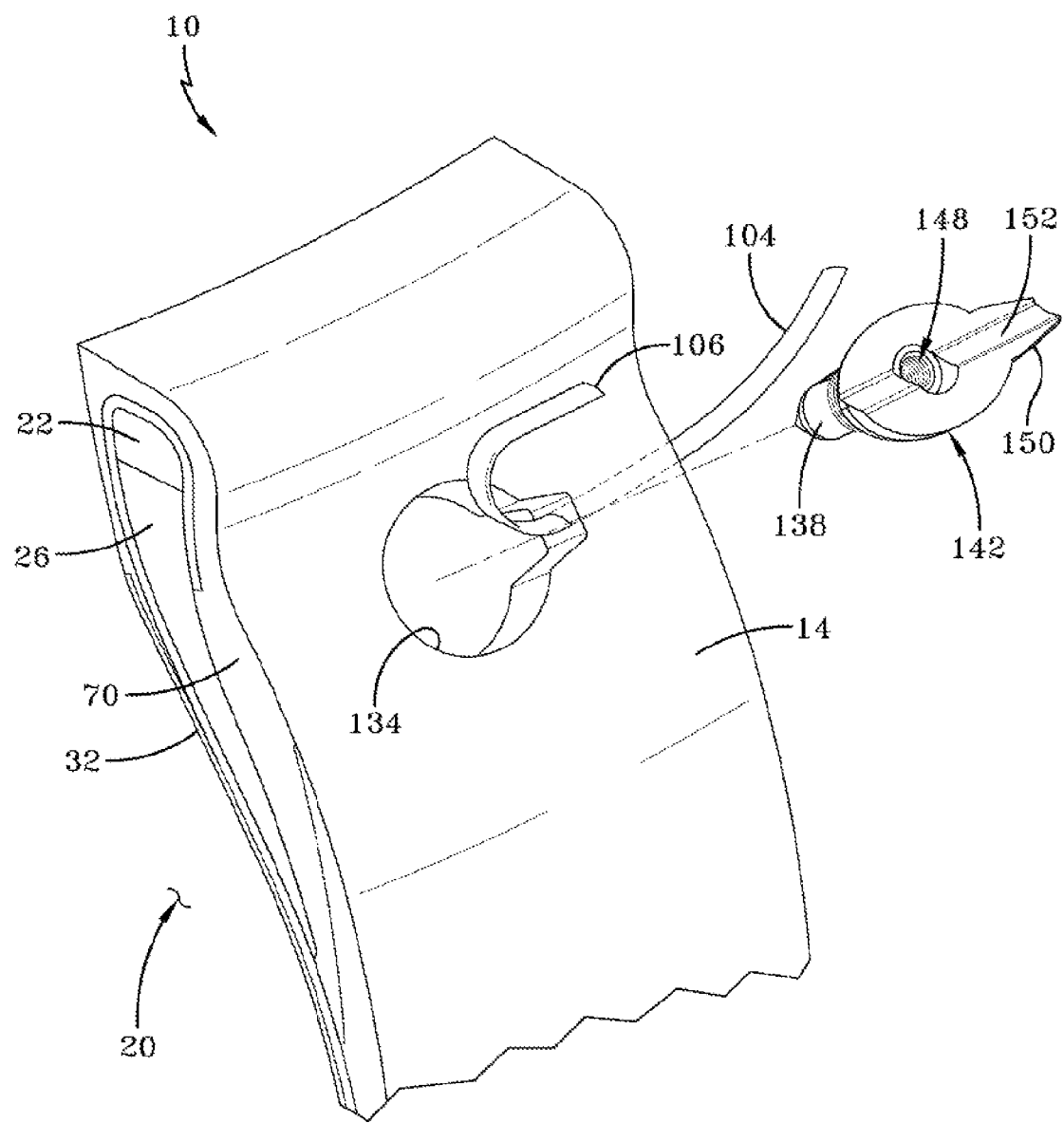
FIG. 19A is an enlarged sectioned view showing the outlet bottom core unit being inserted into the cavity under the coated filament and the punch forced through the tire wall into the cavity chamber with the chafer groove re-opened to allow room for the conical end of the outlet core bottom unit to be fully seated into cavity.
Figure 19B:
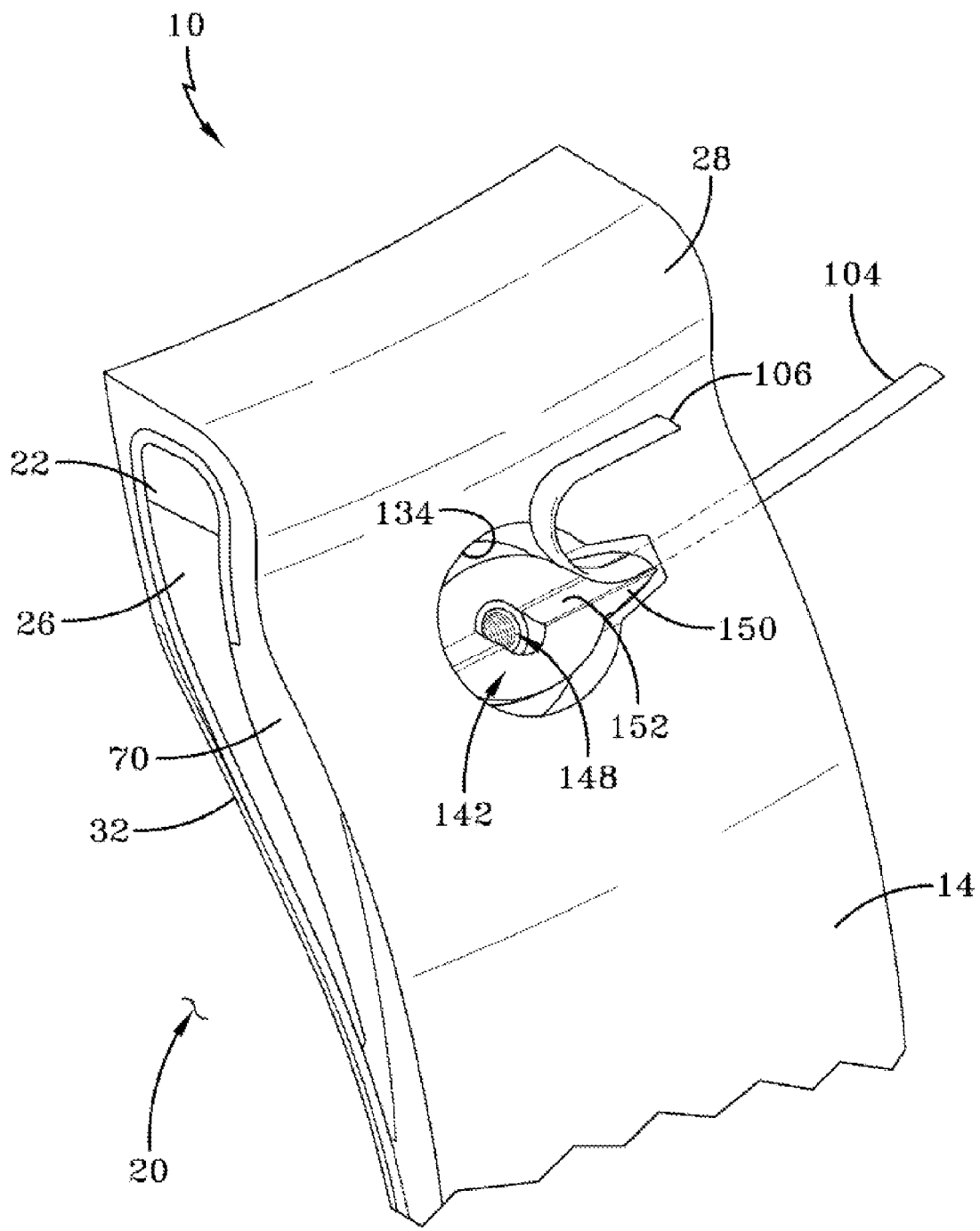
FIG. 19B is an enlarged sectioned view of the bottom outlet core unit fully seated into the cavity.
Figure 19C:
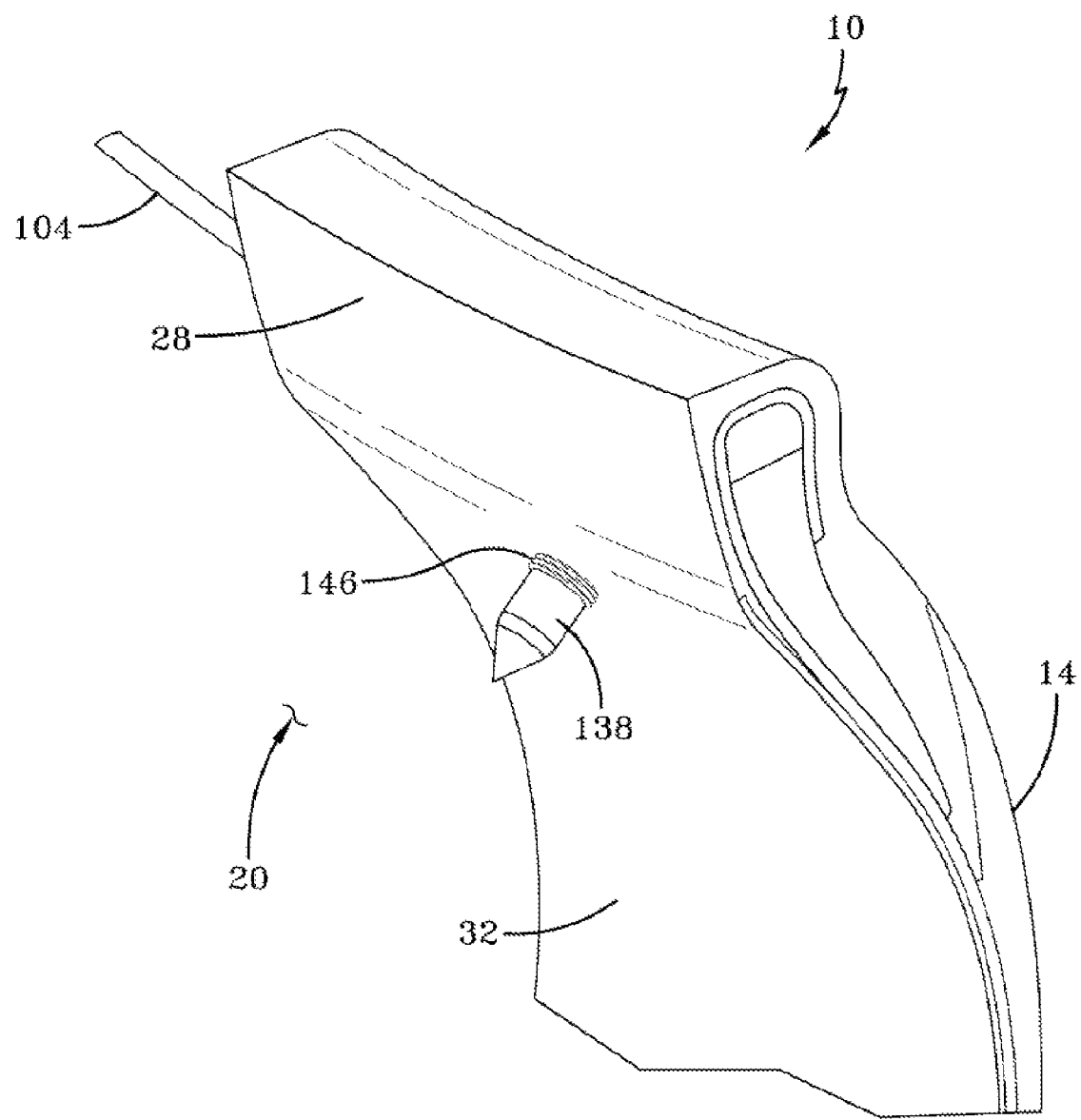
FIG. 19C is an enlarged sectioned view from cavity side showing the screw punch fully inserted through the tire wall.
Figure 19D:
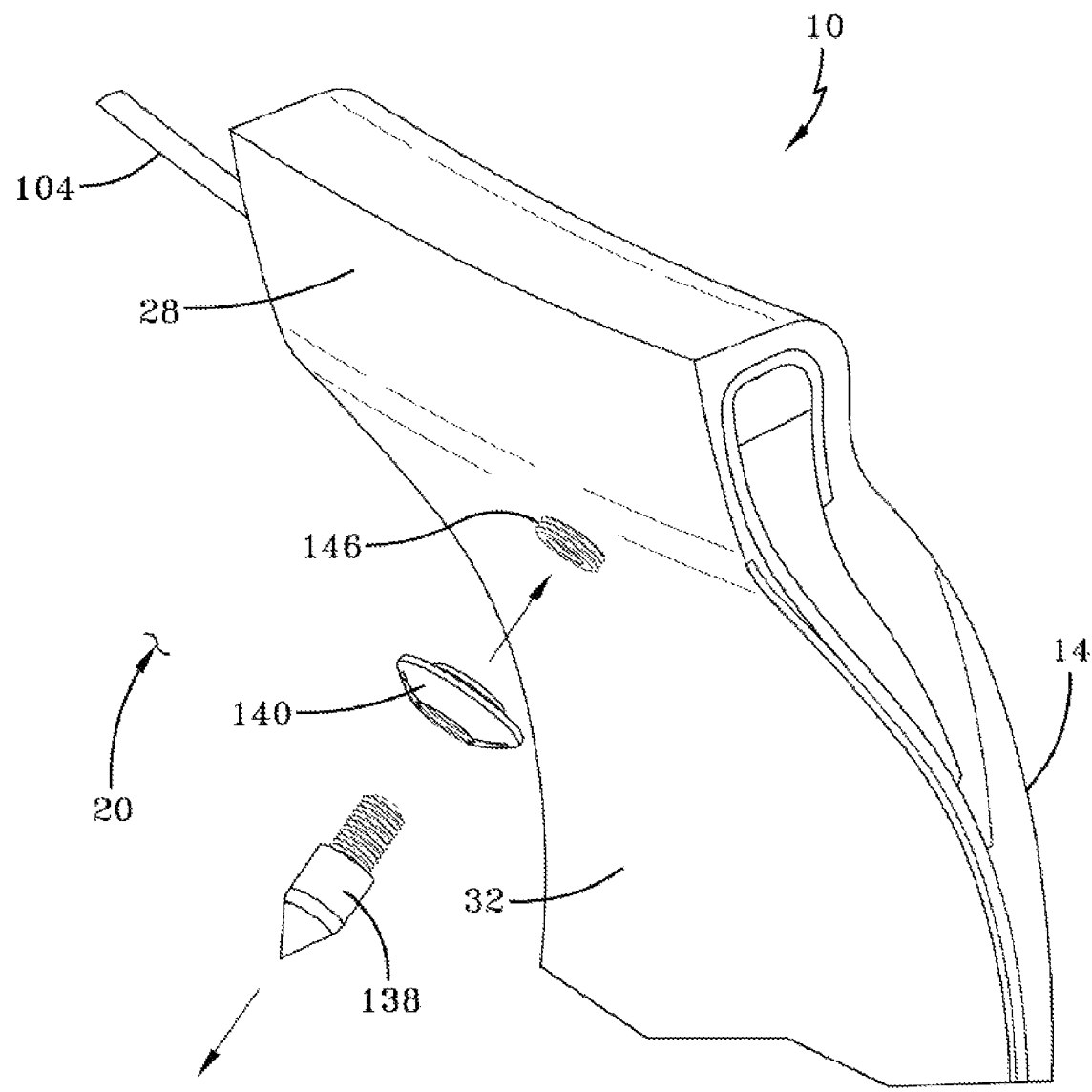
FIG. 19D is an enlarged sectioned view of the screw punch removed from the outlet bottom core half component with the nut attached to thread shaft.
Figure 19E:
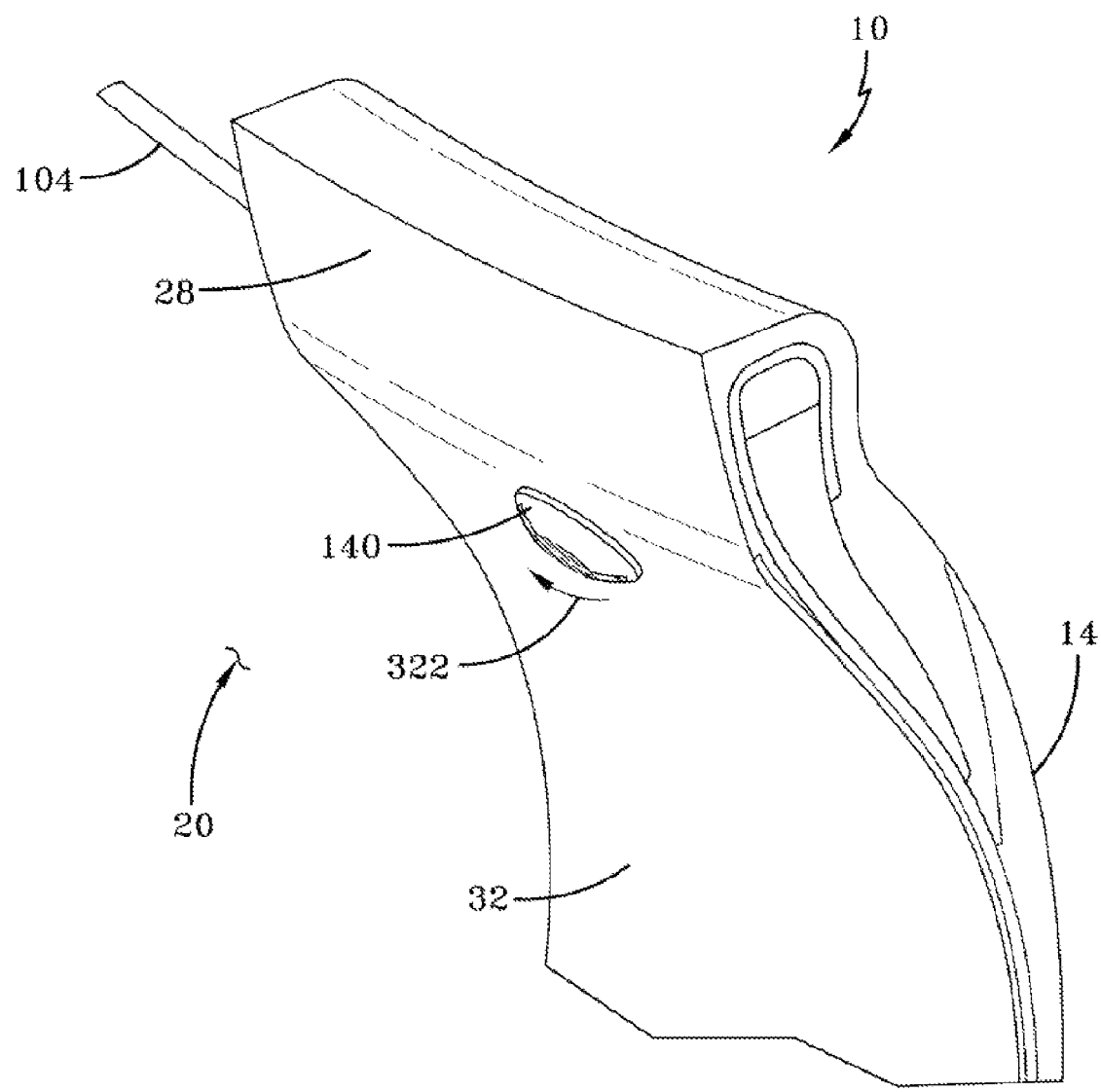
FIG. 19E is an enlarged sectioned view showing the nut fully attached to the outlet bottom core shaft.
Figure 19F:
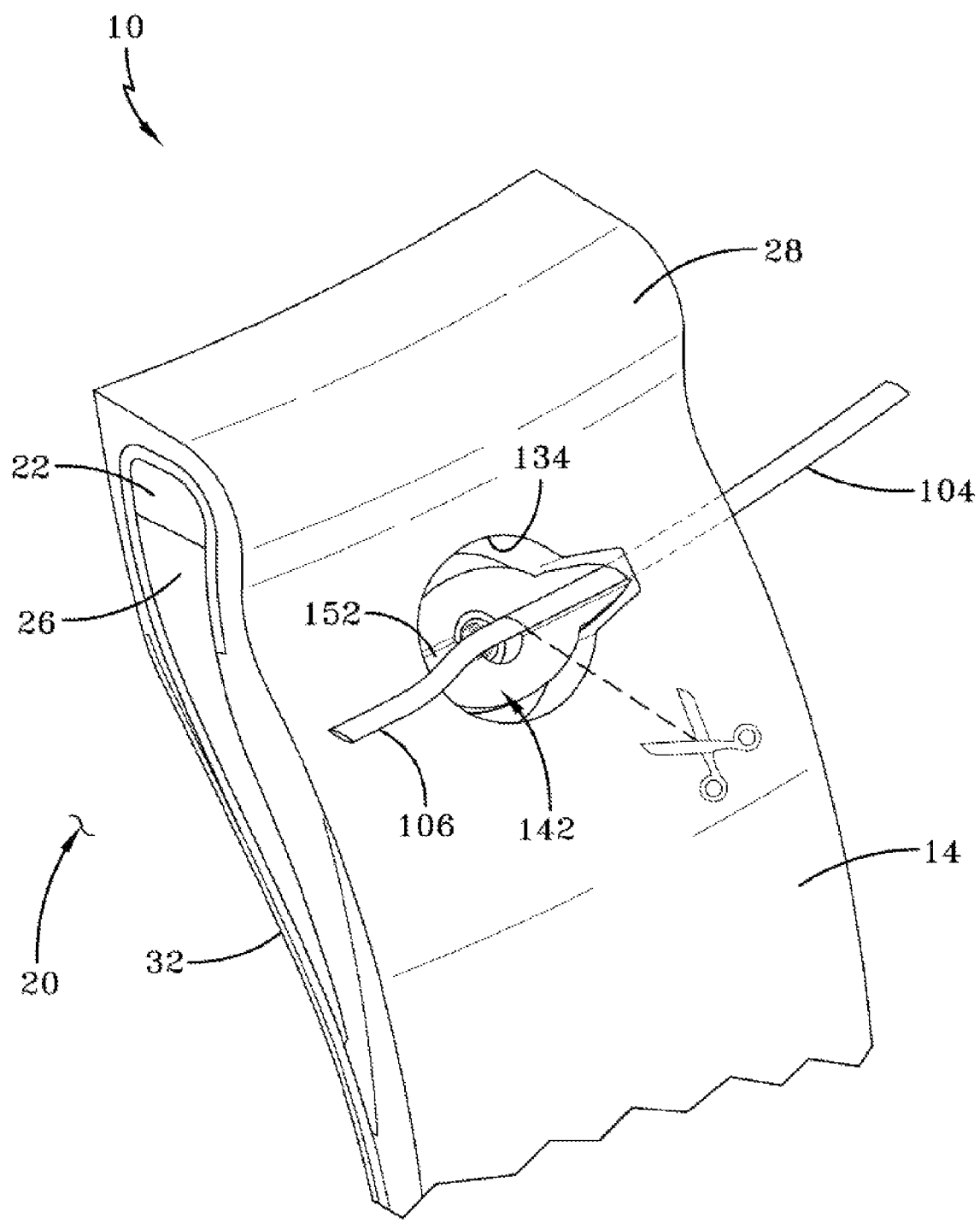
FIG. 19F is an enlarged sectioned view of the coated filament cut to length at the outlet bottom core strip cavity.
Figure 19G:
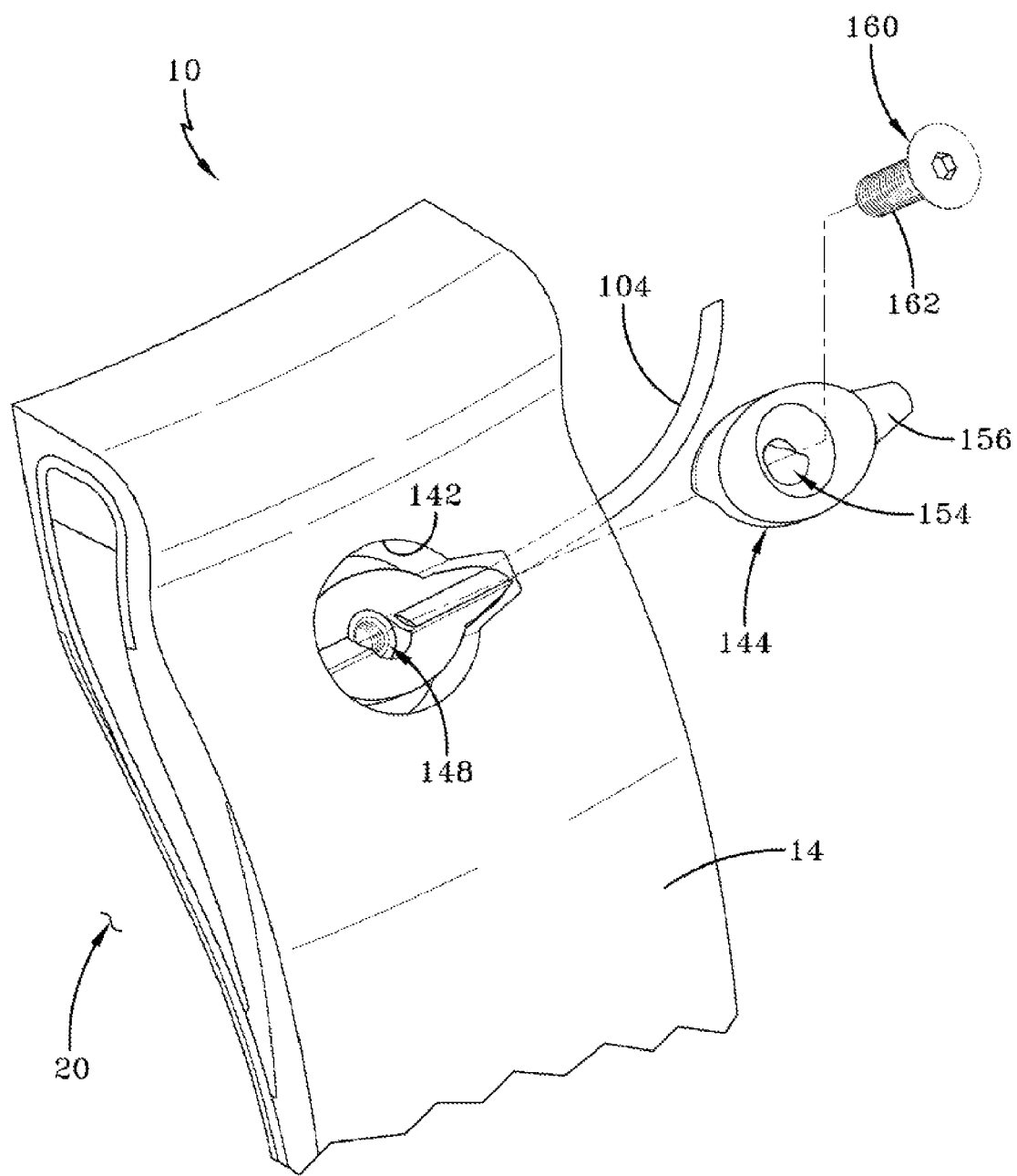
FIG. 19G is an enlarged sectioned view of the outlet top core component placed into the cavity and screwed into place.
Figure 19H:
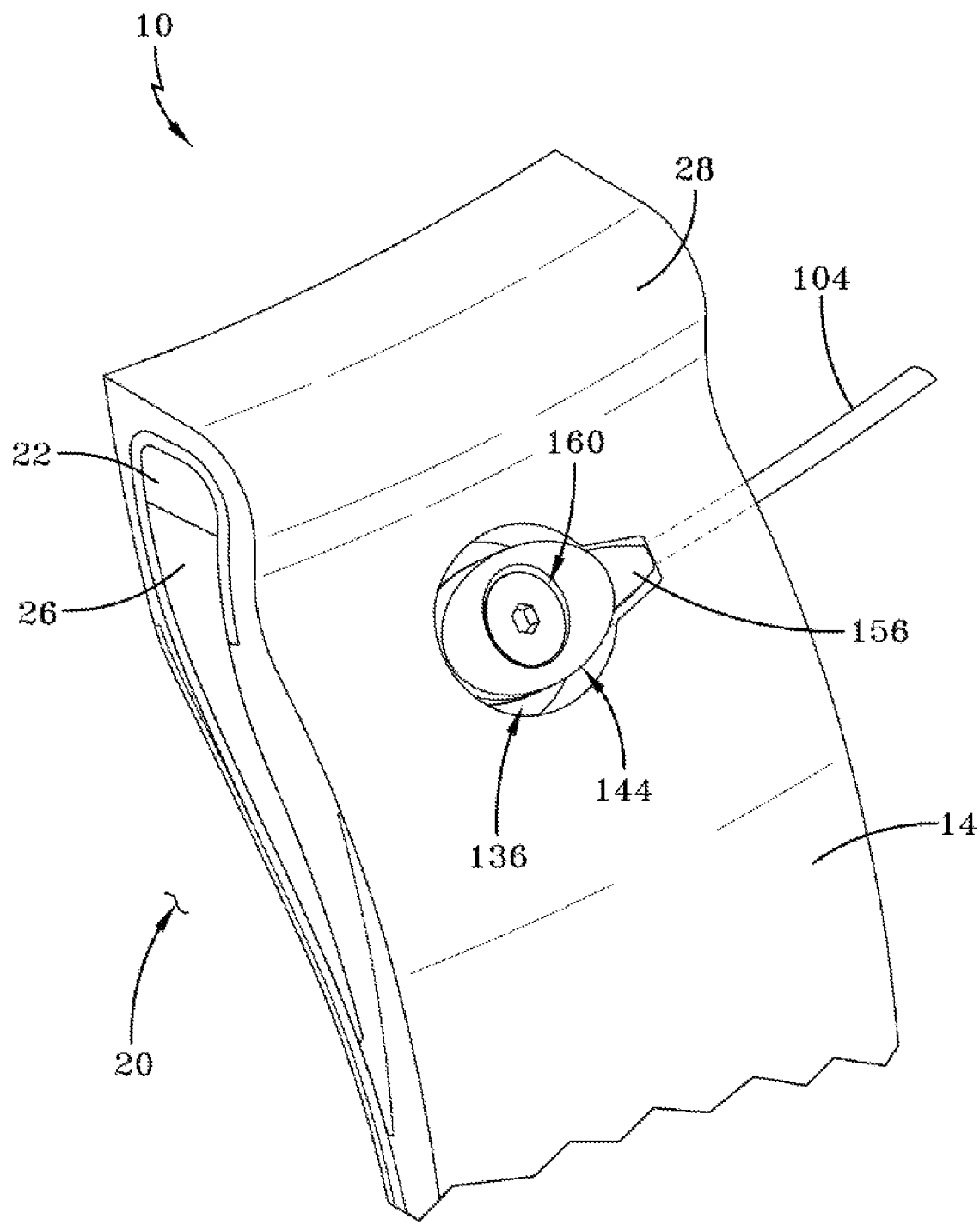
FIG. 19H is an enlarged sectioned view showing the outlet core halves and screw fully assembled.
Figure 19I:
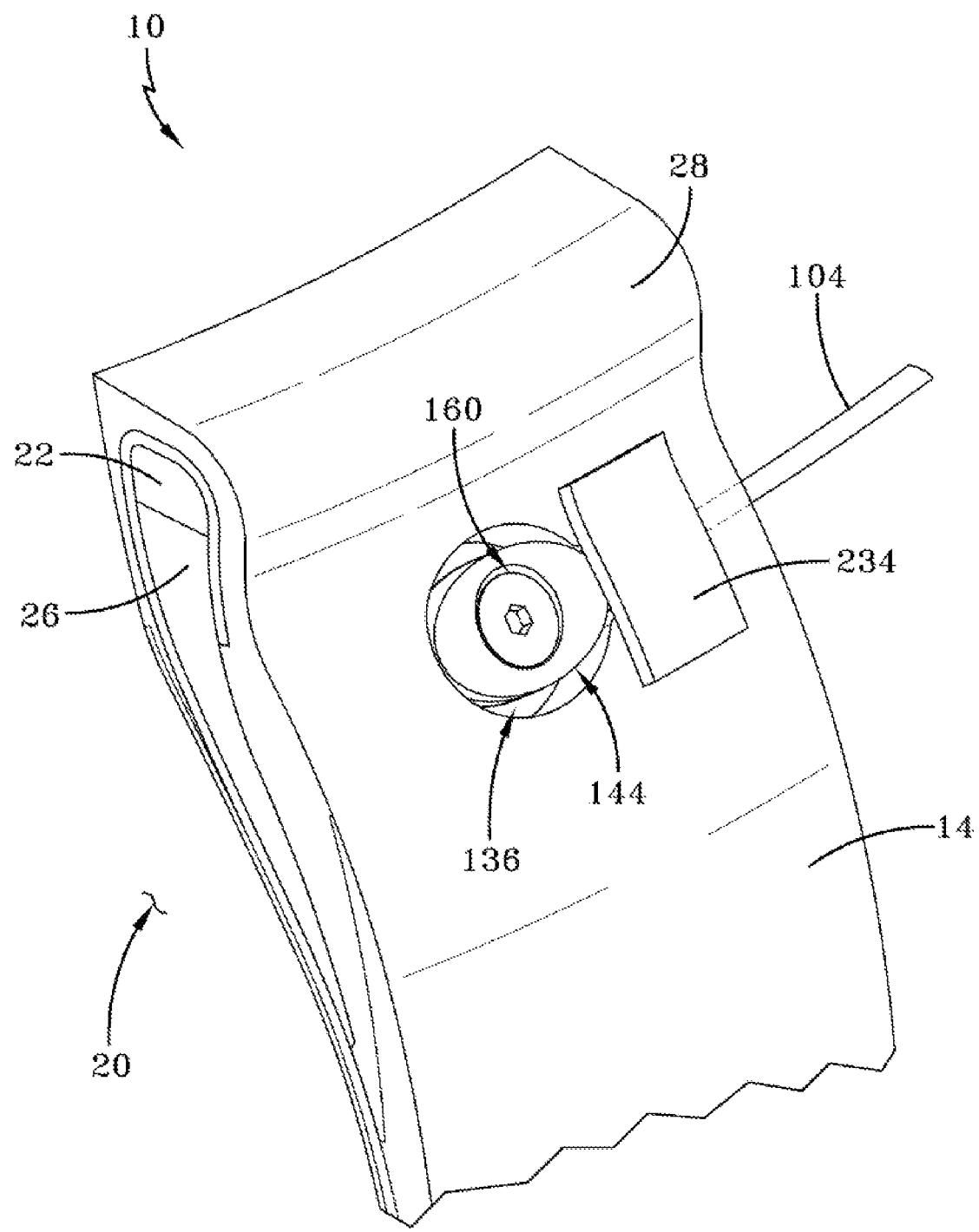
FIG. 19I is an enlarged sectioned view showing the conical end of outlet core assembly covered with a rubber patch.
Figure 20:
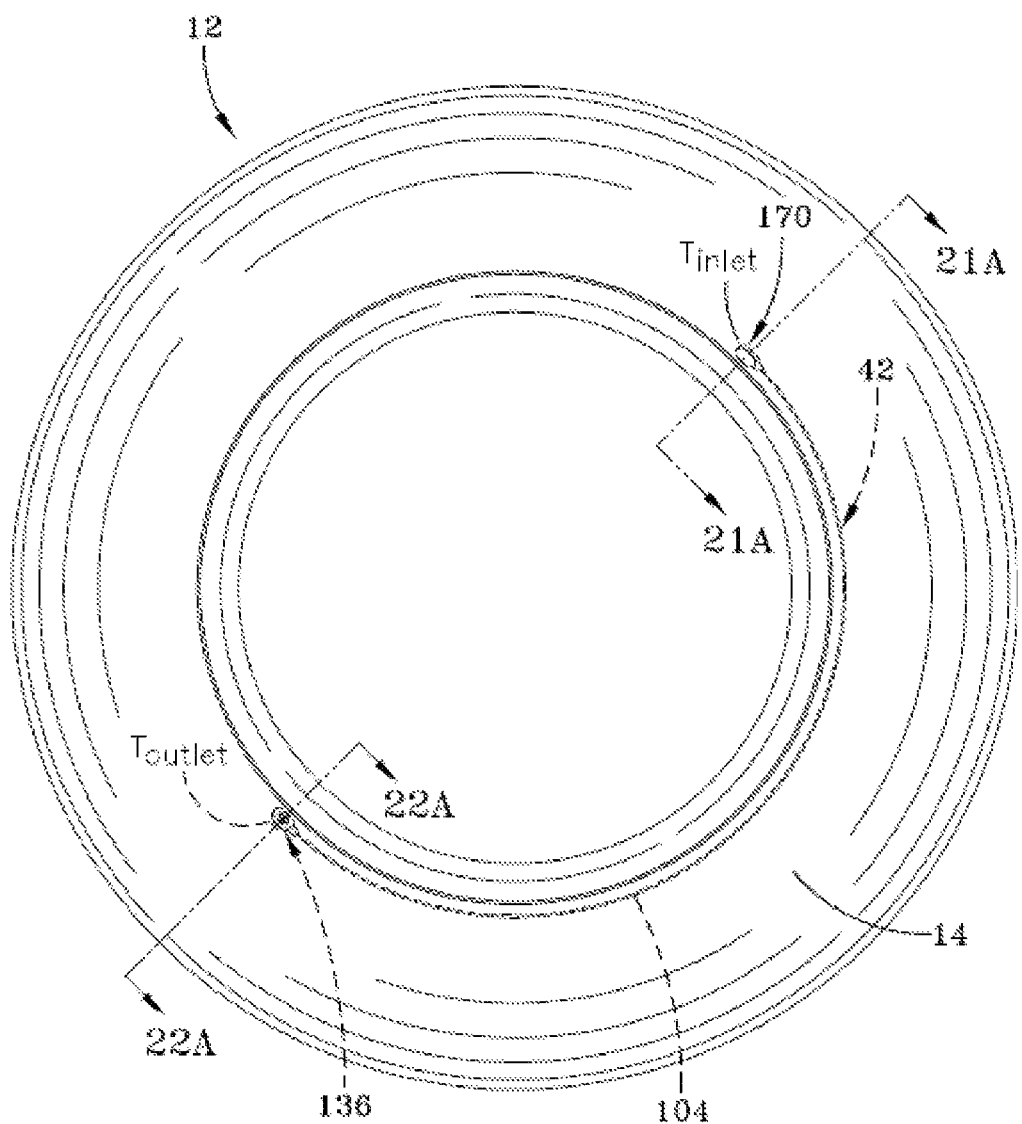
FIG. 20 is a side view of a tire showing the inlet and outlet core locations before curing.

FIGS. 19A through 19I show sequential assembly of the outlet core assembly embodiment of FIGS. 14A through 14D into the green tire outlet cavity 134 and to the outlet end portion 106 of the coated filament 104. In FIG. 19A, the bottom half-component 142 is inserted into the cavity 134 after the circular cavity 134 has been enlarged into a keyhole configuration to accommodate the geometry of the component 142. The screw punch 138 is pushed through to protrude through tire wall into the tire cavity 20 from the cavity 134 as seen in FIG. 19C. FIG. 19B shows the component 142 fully seated into the cavity 134, the tapered conical half-protrusion 159 projecting into the chafer channel occupied by coated filament 104 with the coated filament 104 residing within half-channel 152. In FIGS. 19D and 19E, the screw punch 138 is removed and replaced by the nut 140 attached to the screw thread 146. In FIG. 19F, the outlet end portion 106 of coated filament 104 is cut to length at the outlet cavity 134 and placement of the outlet top half-housing 144 over the bottom half-housing 142 within cavity 134. The screw 160 is threaded at 162 into socket 148 to affix both half-housings 142, 144 together as shown in FIGS. 19G and 19H. A rubber patch 234 is affixed over the outlet core assembly 136 in place for tire cure.

Figure 21B:
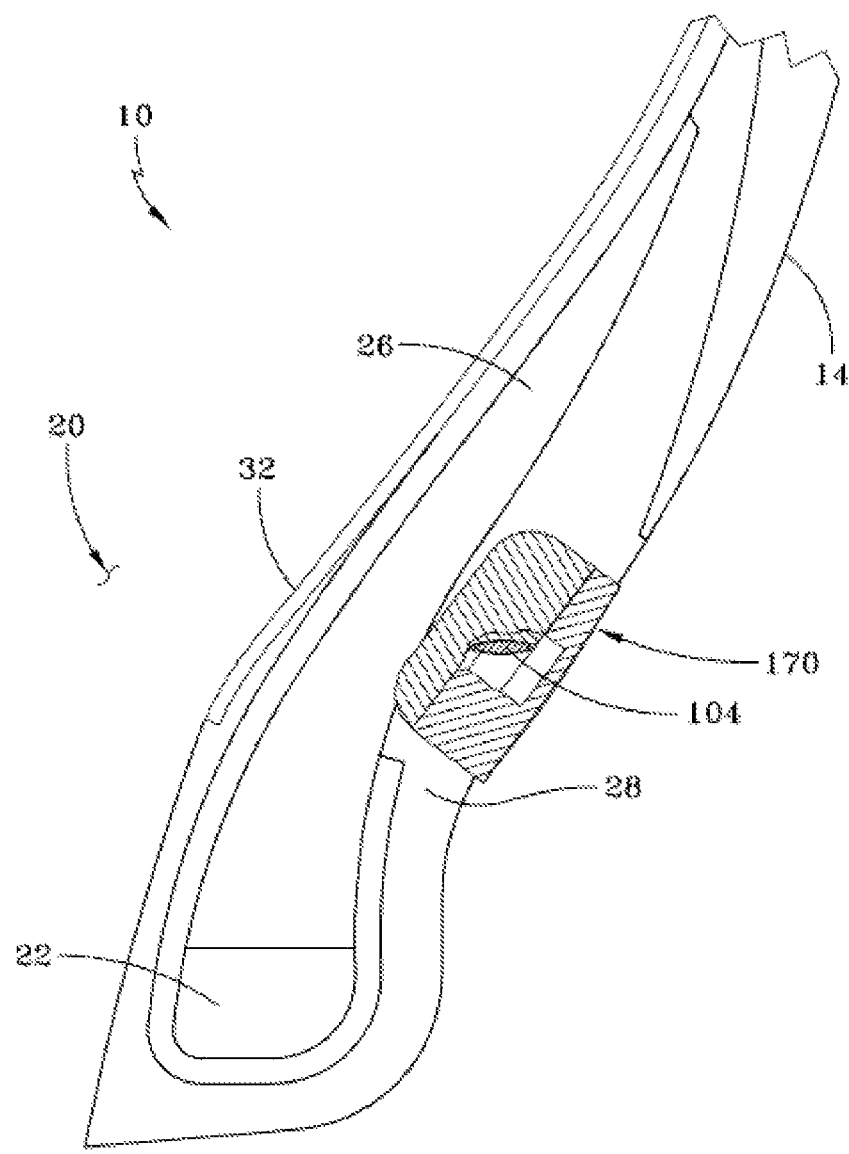
FIG. 21B is an enlarged view of the inlet core taken from FIG. 21A.
Figure 22A:
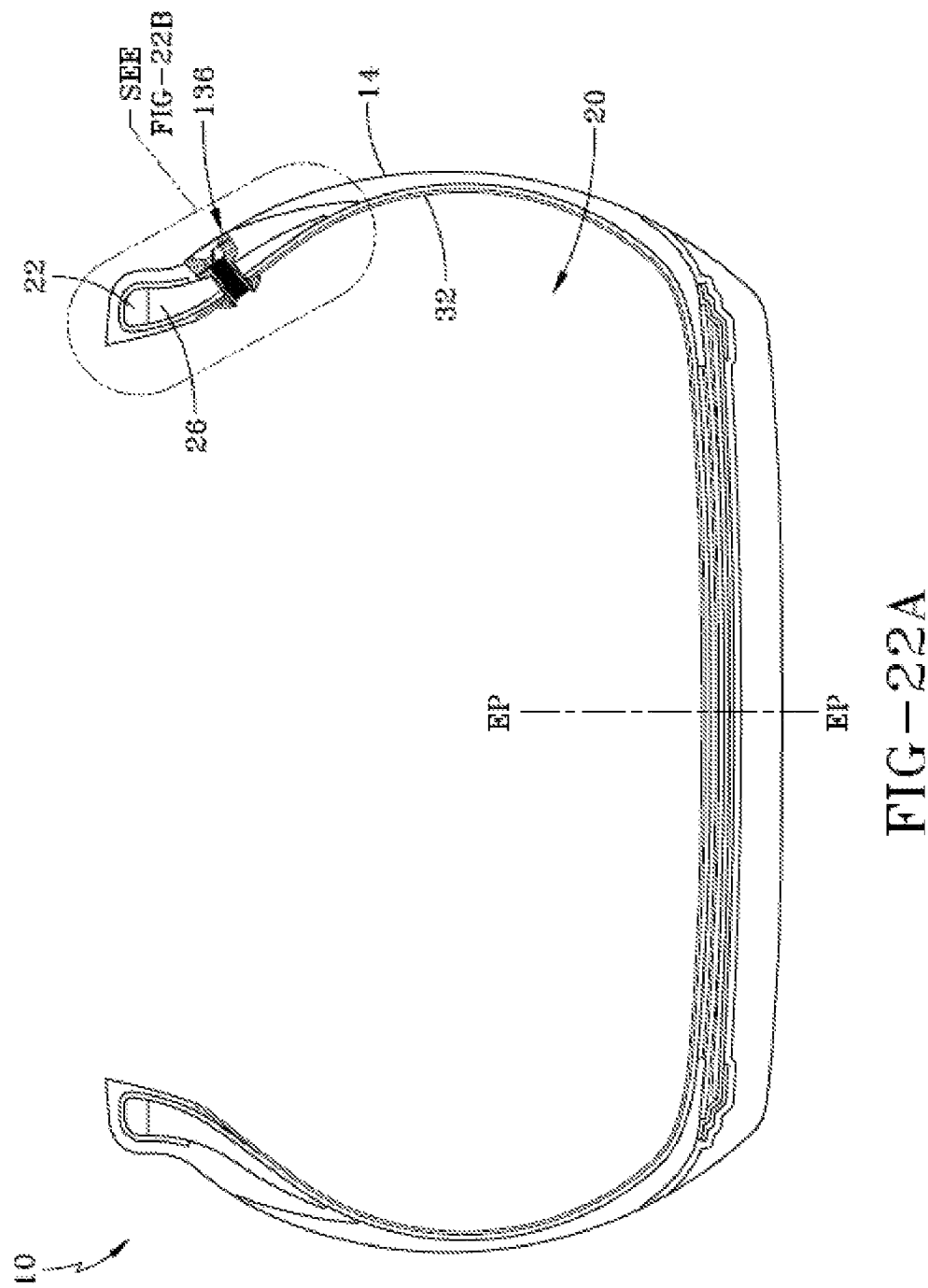
FIG. 22A is a section view taken from FIG. 20 showing the outlet core.
Figure 22B:
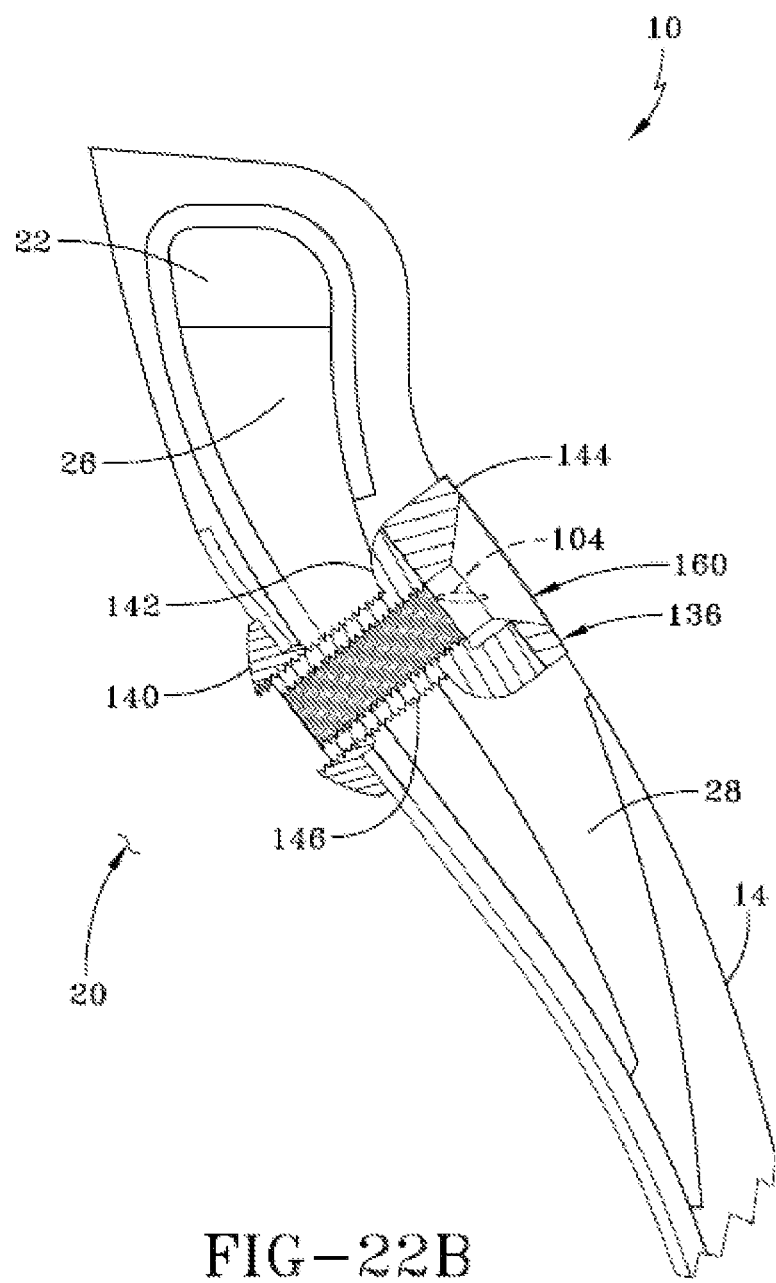
FIG. 22B is an enlarged view of the outlet core taken from FIG. 22A.

FIGS. 20, 21A, 21B, 22A and FIG. 22B show the tire with the inlet and outlet temporary core assemblies in place before curing. As seen, the coated filament 104 enclosed within a chafer component 28 of the green tire extends 180 degrees between the pre-cure outlet core assembly 136 and the pre-cure inlet core assembly 170. An enlarged depiction of the inlet core location is shown in FIG. 21B from section view FIG. 21A and the outlet core location is shown enlarged in FIG. 22B from the section view of FIG. 22A. The coated filament 104 resides enclosed within the chafer channel and thereby preserves the structural integrity of the chafer channel through tire cure. The sectional configuration of the coated filament 104, as seen, is complementary to chafer channel in which it is encased surrounded by chafer composition, and thereby maintains the configuration of the chafer channel throughout tire cure.

Figure 23:
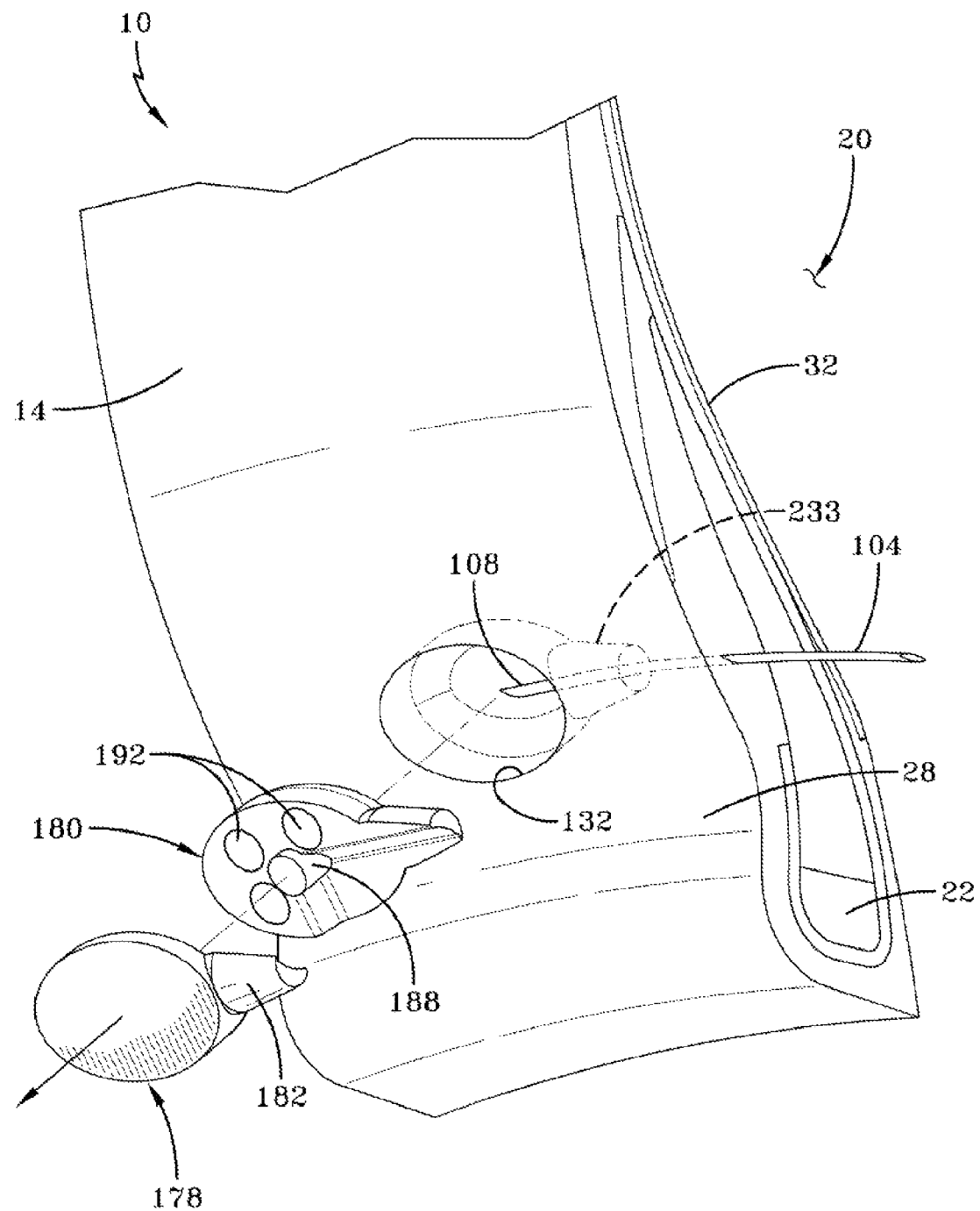
FIG. 23 is an enlarged sectioned view showing the inlet core halves being removed after curing.
Figure 24:
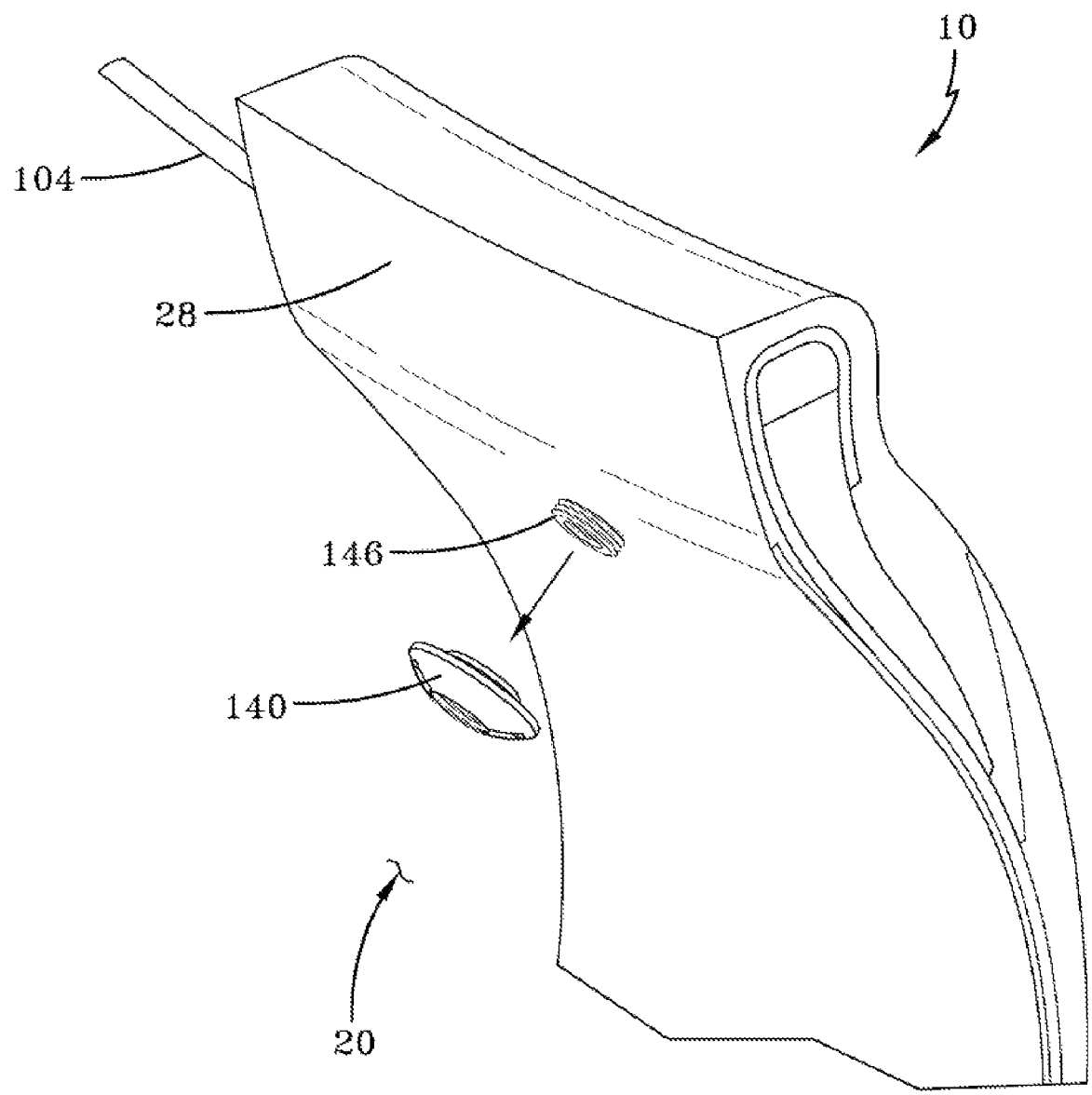
FIG. 24 is an enlarged sectioned view showing the nut removed from the outlet core threaded shaft.
Figure 25:
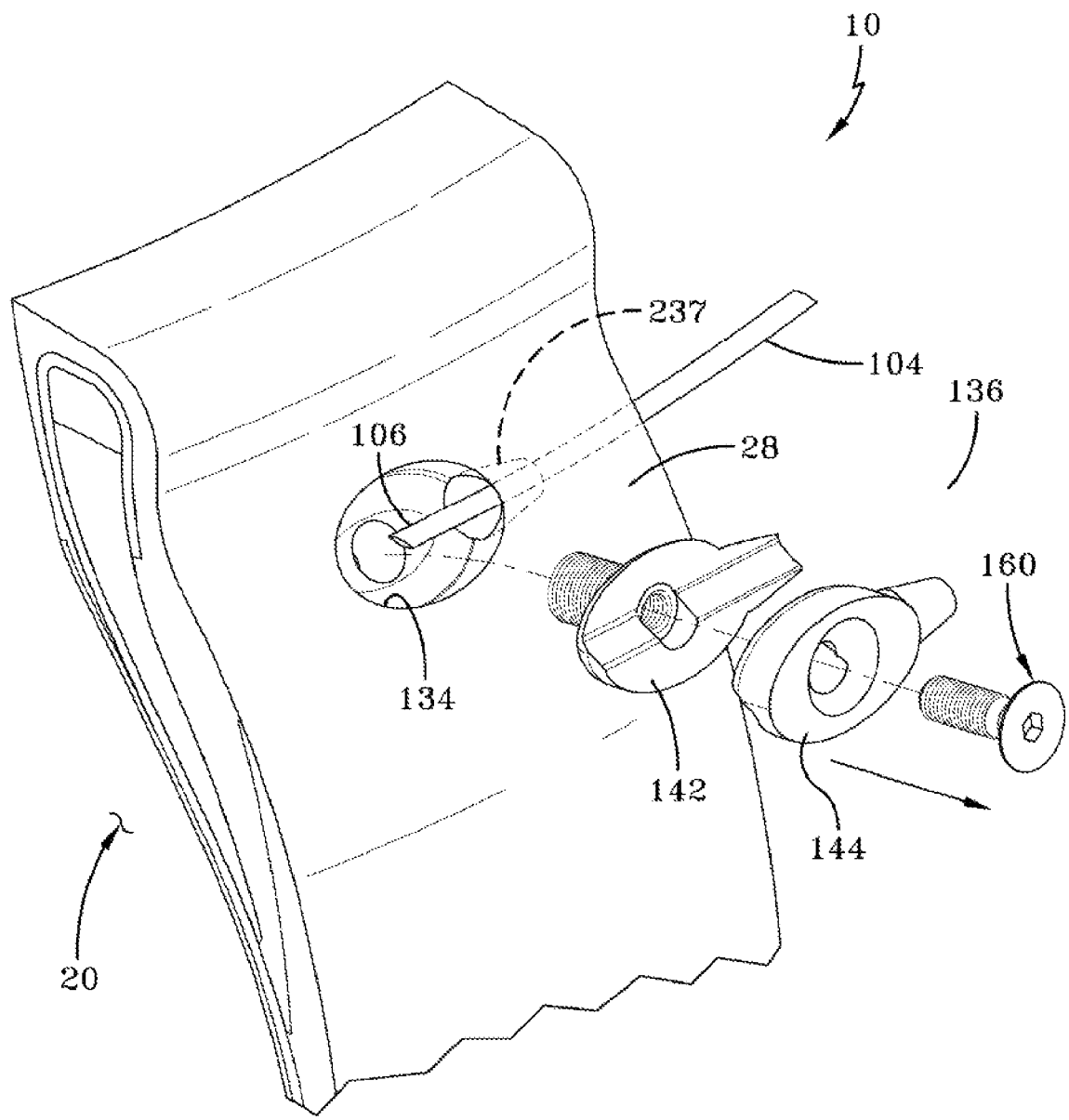
FIG. 25 is an exploded view of the outlet core halves disassembled and removed from the sidewall cavity.

Referring to FIG. 23, the post-cure removal of the half-housings 178, 180 from the inlet cavity 132 is shown. The cavity 132 is thus opened including a funnel-shaped cavity portion 233. FIGS. 24 and 25 show the nut 140 removed from the outlet core threaded shaft 146 to initiate a post-cure removal of the outlet core assembly 136. The assembly components 142, 144 are removed from the outlet cavity 134, leaving the cavity 134 including funnel-shaped adjacent cavity portion 237 open. Thereafter, as shown by FIG. 26 the coated filament 104 is removed from the tire chafer channel, whereby the chafer channel left by the vacated coated filament 104 becomes an elongate unobstructed 180 degree air passageway 238 from the inlet cavity 132 to the outlet cavity 134, wholly integrated within the chafer component 28.

Figure 26:
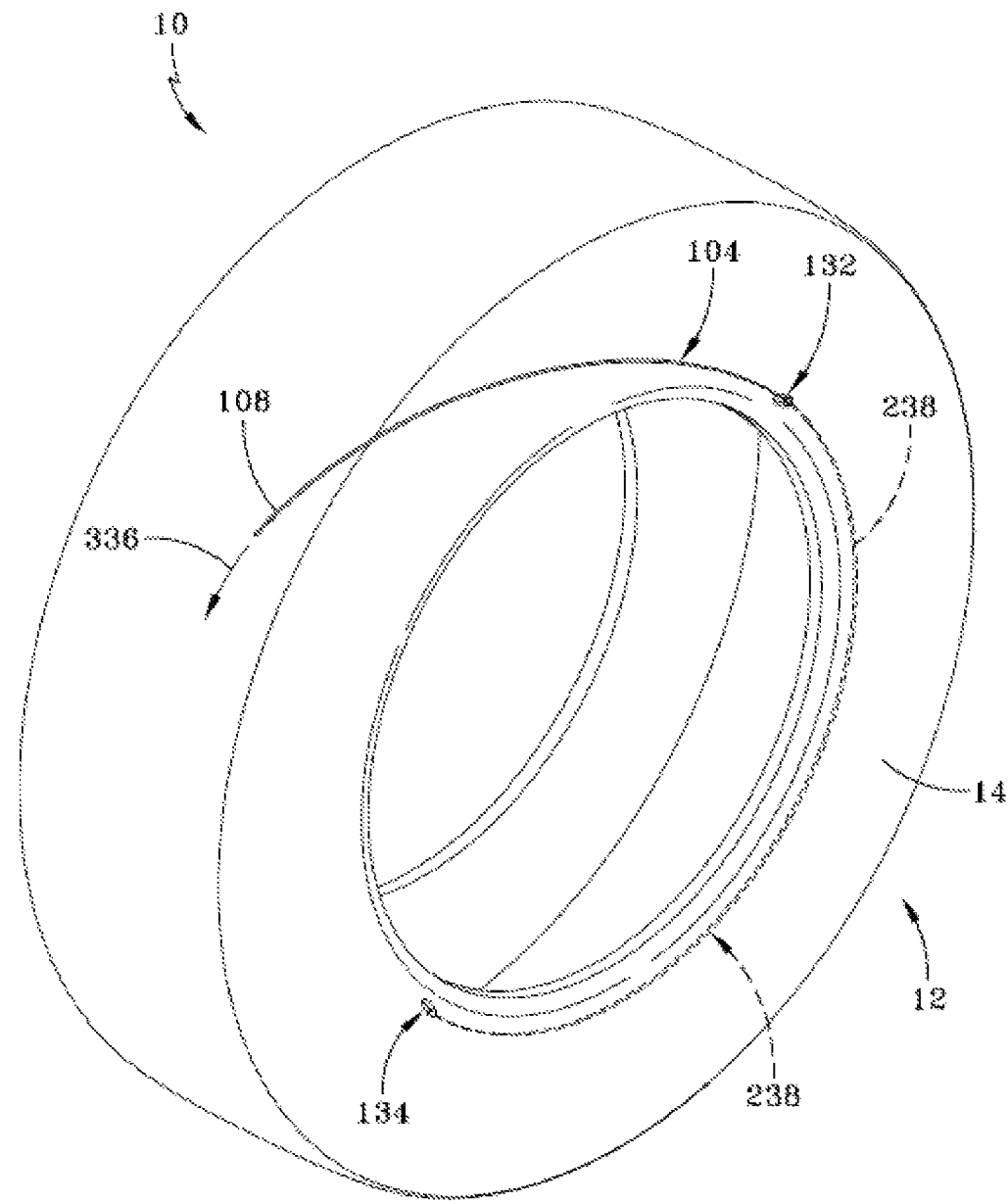
FIG. 26 is a side elevation showing the coated filament removed from the tire sidewall.

Removal of the coated filament 104 as indicated in FIG. 26 is shown as a complete removal of the filament with the associated coating. In fact, while the filament is entirely removed, in some embodiments at least part of the coating material may remain adhered to the interior surfaces of the air passageway 238. The amount of coating material remaining in the air passageway 238 is insufficient to block the passage of air and the air passageway remains unobstructed and usable for its intended purpose as a peristaltic tube.

As inserted into the tire component, the coated filament is constructed of a relatively thin filament coated with a coating material that is at least partially dispersible in the rubber of the rubber component during the cure heating cycle. That is, the coating material comprises one or more substances that may at least partially dissolve or otherwise combine with the rubber compound of the rubber component during the cure heating cycle. By so partially dispersing in the rubber of the rubber component, the coating is at least partially disengaged from the surface of the filament, thus facilitating removal of the filament from channel and creating the air passageway.

The relatively thin filament is an elongate body of relatively constant cross section. Suitable cross sections for the filament are not limited, and include circular, oval, lens, and the like. Suitable filaments include those made of metal and polymers. Suitable metals include steel. Suitable polymers include thermoplastics, silicone rubber, and the like.

Thermoplastics suitable for use as filaments include polyamides, polyesters, and poly(vinyl alcohols). Included in the polyamides are nylon 6, nylon 66, nylon 612, among others. Included in the polyesters are polyethylene terephthalate and polyethylene naphthalate, among others.

In one embodiment, the filament has a relatively circular cross section. In one embodiment, the filament has a diameter ranging from 0.5 to 5 mm.

In one embodiment, the filament is a so-called nylon monofilament.

The coating material used for coating the filament comprises one or more substances that may at least partially disperse or otherwise combine with the rubber compound of the rubber component during the cure heating cycle. The rubber dispersible substances include oils, waxes, and rubber softeners.

The coating material may include an oil. Suitable oils include aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom. Suitable vegetable oils include canola (rapeseed) oil, sunflower oil, soybean oil, castor oil, and the like.

The coating material may include a wax. Suitable waxes include synthetic (e.g. polyethylene and Fischer-Tropsch waxes) and natural (candelilla carnauba, beeswax, rice bran or mixtures thereof) and petroleum (e.g. microcrystalline and paraffin).

The coating material may include rubber softeners. Rubber softeners include tallow, hydrogenated tallow, glycerol monostearate, glycerol triacetate, lecithin, mono-, diglycerides and triglycerides, acetylated glycerides and fatty acids having 16 to 18 carbon atoms (e.g. stearic, palmitic, oleic, linoleic and linolenic acids), fatty acid esters, fatty alcohols, fatty amides or mixtures thereof. Suitable fatty acid esters, fatty alcohols, and fatty amides include those disclosed in U.S. Pat. No. 7,231,951 fully incorporated herein by reference.

In one embodiment, the coating material includes a mixture of one or more fatty acids having 16 to 18 carbon atoms. Such a mixture may include one or more or stearic, palmitic, oleic, linoleic and linolenic acids. Typical of such fatty acid blends is technical grade "rubber makers" stearic acid typically containing approximately 56 percent by weight stearic acid, 29 percent by weight palmitic acid, 8 percent by weight oleic acid and 7 percent by weight other fatty acids.

The coating material may include, in addition to the dispersible material, a diluent. Diluents may be present to dilute the dispersable substances to reduce the viscosity. Suitable diluents include hydrocarbon solvents including tetrhydrofuran, hexane, cyclohexane, and the like. Other diluents include alcohols such as ethanol and propanol, and carboxylic acids such as acetic acid. The diluent may be present in an amount ranging from 1 to 50 parts by weight.

The coating material may include, in addition to the dispersible material, a solid lubricant. Suitable solid lubricants include graphite, talc, and the like. The solid lubricant may be present in the coating material in an amount ranging from 1 to 30 parts by weight.

The coating material is deposited on the surface of the filament in the form of a melt which is subsequently solidified to form the coating. Alternatively, the coating material is deposited on the surface of the filament in the form of a solution, with subsequent drying to remove volatile solvents or other diluents.

The coating material is disposed on the outer surface of the filament by exposing the filament to the coating material. The coating may be disposed on the outer surface of the filament variety of processes, including dipping, spraying, brushing, wiping and the like.

In one embodiment, it may be desirable to use an elastomer overcoat over the coating material, especially in the case where a dry lubricant is included. Use of a dry lubricant may result in migration of the dry lubricant into the splice formed upon closure of walls 82, 84 around coated filament 104 (see FIGS. 10A, 10B, and 10C). Such migration of dry lubricant is undesirable as it may lead to weakening of the interface between walls 82, 84. The elastomer overcoat may be applied, for example, by dipping the coated filament into a elastomer latex, followed by drying in air. Single or multiple dip passes of the coated filament into elastomer latex may be used, with drying of the latex between dips. Suitable elastomer latex may include latex of natural rubber, styrene-butadiene rubber, styrene-butadiene-vinylpyridine rubber, and the like.

The invention is further illustrated by the following examples.

Example 1

In this example, the ability of a coated filament to be pulled out of a cured rubber sample is illustrated. Samples of a nylon monofilament of approximately circular cross section were dipped coated with a several different coating materials. Coating materials were prepared by mixing dispersible material, diluent, and dry lubricant with compositions of the coating materials as shown in Table 1. Single lengths of nylon monofilament were manually dipped in a prepared coating material contained in a test tube. After dipping, the coating material on the monofilament was allowed to dry in the case of deposition from solution, or solidify if deposited from a melt.

TABLE 1

| Sample No. | Dip Type | Dispersible | Wt, g | Diluent | Wt, g | Lubricant | Wt, g |
|---|---|---|---|---|---|---|---|
| 1 | Solution | Rapeseed Oil | 50 | Ethanol | 50 | None | 0 |
| 2 | Solution | Castor Oil | 50 | Ethanol | 50 | None | 0 |
| 3 | Solution | None | 0 | Ethanol | 100 | None | 0 |
| 4 | Solution | Rapeseed Oil | 50 | Acetic Acid | 50 | None | 0 |
| 5 | None | None | 0 | None | 0 | None | 0 |
| 6 | Solution | Castor Oil | 50 | Acetic Acid | 50 | None | 0 |
| 7 | Solution | None | 0 | Acetic Acid | 100 | None | 0 |
| 8 | Solution | Fatty Acid[1] | 25 | THF[2] | 75 | None | 0 |
| 9 | Melt | Wax | 100 | None | 0 | None | 0 |
| 10 | Melt | Fatty Acid[1] | 100 | None | 0 | None | 0 |
| 11 | Melt | Fatty Acid[1] | 84.4 | None | 0 | Graphite | 15.6 |
| 12 | Melt | Fatty Acid[1] | 84.4 | None | 0 | Talc | 15.6 |
| 13 | Solution | Fatty Acid[1] | 20 | THF[2] | 60 | Graphite | 20 |
| 14 | Solution | Fatty Acid[1] | 20 | THF[2] | 60 | Talc | 20 |

[1]A blend of fatty acids containing approximately 56 percent by weight stearic acid, 29 percent by weight palmitic acid, 8 percent by weight oleic acid and 7 percent by weight other fatty acids.
[2]Tetrahydrofuran Standard wire adhesion tests (SWAT) were conducted by embedding a coated monofilament in a green rubber composition. The embedded length of the monofilament was 7.5 cm. The rubber articles were then cured at 150° C. for 28 minutes. The monofilament in these rubber compositions were then subjected to a pull-out test, according to ASTM Standard D2229-73. The results of these pull-out tests (SWAT) and rubber coverage are given in Table 2 and expressed in Newtons.

TABLE 2

| Sample No. | Composition | SWAT Pull-Out force, N |
|---|---|---|
| 1 | Rapeseed Oil/Ethanol | 81 |
| 2 | Castor Oil/Ethanol | 81 |
| 3 | Ethanol | 76 |
| 4 | Rapeseed Oil/Acetic Acid | 45 |
| 5 | Control | 82 |
| 6 | Castor Oil/Acetic Acid | 44 |
| 7 | Acetic Acid | 32 |
| 8 | Fatty Acid[1]/THF | 80 |
| 9 | Wax (Melt) | 68 |
| 10 | Fatty Acid[1] (Melt) | 41 |
| 11 | Fatty Acid[1]/Graphite (Melt) | 20 |
| 12 | Fatty Acid[1]/Talc (Melt) | 32 |
| 13 | Fatty Acid[1]/Graphite/THF | 20 |
| 14 | Fatty Acid[1]/Talc/THF | 27 |

[1]A blend of fatty acids containing approximately 56 percent by weight stearic acid, 29 percent by weight palmitic acid, 8 percent by weight oleic acid and 7 percent by weight other fatty acids.

As seen in Table 2, the lowest pull-out force was seen using a combination of stearic acid and graphite, whether from a melt or THF solution.

Example 2

In this example, the effect of graphite content on the ability of a monofilament treated with a fatty acid melt is illustrated. Samples of nylon monofilament were dipped in a fatty acid melt as described in Example 1, with the coatings containing various amounts of graphite. The coated samples were embedded in rubber and tested for pullout force following the procedure in Example 1, with results given in Table 3.

TABLE 3

| Sample No. | Graphite Content, Weight Percent | SWAT Pull-Out Force, N |
|---|---|---|
| 14 | 0 | 26 |
| 15 | 0.6 | 31 |
| 16 | 1.08 | 29 |
| 17 | 2.1 | 21 |
| 18 | 5.08 | 19 |
| 19 | 10.06 | 13 |
| 20 | 20 | 8 |

As seen in Table 3, the pull-out force steadily decreased with increasing graphite content.

Example 3

In this example, preparation of a tire with an air passage is illustrated. Continuous nylon monofilament was coated from a melt of fatty acid and 20 weight percent graphite by drawing the monofilament from a spool through a beaker of the melt, followed by solidification in air. The coated monofilament was then wound on a spool. Eighty cm lengths of the coated monofilament we embedded in a semi-circumferential slit made with a razor knife in the chafer of a green tire, with a free end of the monofilament allowed to extend from on end of the slit. The slit was then stitched closed with a roller and the tire cured for 18 minutes at 150° C.

After cure, the exposed free end of the monofilament was grasped manually with pliers and the monofilament easily removed manually from the tire, leaving an open passage in the chafer of the tire. The procedure was performed on two tires with comparable results.

Example 4

In this example, the use of a natural rubber topcoat over a graphite/fatty acid coating to improve the closure of the splice resulting from closure of the rubber compound around the monofilament. Microscopic examination of the cured SWAT samples from Example 2 showed some migration of the graphite into the splice formed from the interface between the rubber compound halves used to prepare the sample. The presence of the graphite in this splice (and in the splice formed upon stitching the chafer slit as described in Example 3) is undesirable as it may lead to a weakening of the splice and possible failure of the air passage remaining after removal of the filament.

Nylon monofilament was coated with a melt of fatty acid and 20 weight percent graphite as described in Example 2. The coating monofilament was then further dipped in a low ammonia natural rubber latex. The latex was allowed to air dry at 60 C, forming a natural rubber (NR) layer over the fatty acid/graphite layer. SWAT adhesion tests were performed on various samples following the procedure of Example 1, with the exception that the embedded length of the monofilament was 21 cm. Results of the SWAT adhesion tests are given in Table 4.

TABLE 4

| Sample No. | Coating Composition | NR Overcoat | SWAT pullout force, N |
| --- | --- | --- | --- |
| 21 | None | None | 269 |
| 22 | Fatty Acid/20% graphite | None | 22 |
| 23 | Fatty Acid/20% graphite | Single Dip | 29 |
| 24 | Fatty Acid/20% graphite | Double Dip | 33 |

As seen in Table 4, using a natural rubber overcoat increased the pullout force slightly for samples made using a single dip (Sample 23) and double dip (Sample 24) of natural rubber latex. Microscopic examination of the cured SWAT samples showed no migration of the graphite into the splice area, indication the advantage of including the natural rubber overcoat on the coating material.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of constructing a tire, comprising:
constructing a coated filament, the coated filament constructed by coating a filament with a coating material, the coating material consisting of at least one fatty acid having 16 to 18 carbon atoms and from 1 to 30 parts by weight of graphite with 100 total parts by weight of the at least one fatty acid and the graphite;
encasing the coated filament into containment within an uncured flexible tire component, the coated filament extending between an air inlet and an air outlet cavity in the uncured flexible tire component;
building on a tire building drum a green tire carcass from uncured tire components including the uncured flexible tire component and encased coated filament;
curing the green tire carcass into a cured finished tire including the flexible tire component containing the coated filament;
removing the filament from the cured flexible tire component to leave within the flexible tire component a substantially unobstructed air passageway.

2. The method of claim 1, further comprising removing the filament axially with respect to the filament from the cured flexible tire component by means of drawing a free end of the filament.

3. The method of claim 1, further comprising extending the air outlet assembly through a tire sidewall into communication with a tire cavity.

4. The method of claim 1, further comprising inserting a pre-cure temporary air inlet assembly into the air inlet cavity prior to curing the green tire carcass; and inserting a pre-cure temporary air outlet assembly into the air outlet cavity prior to curing the green tire carcass; and removing the temporary air inlet assembly and the temporary air outlet assembly after curing the green tire carcass.

5. The method of claim 1, further comprising encasing the coated filament into a containment with the uncured flexible tire component by:
forming a channel into the uncured flexible tire component defined by channel sidewalls and a channel bottom wall;
inserting the coated filament into the channel; and
collapsing a flexible channel sidewall over the coated filament.

6. The method of claim 5, wherein forming a channel into the uncured flexible tire component is by extruding the uncured flexible tire component with the channel formed therein.

7. The method of claim 6, wherein the uncured flexible tire component is a tire chafer component.

8. The method of claim 7, further comprising removing the filament axially with respect to the filament from the cured flexible tire component by means of drawing a free end of the filament.

9. The method of claim 7, further comprising extending the air outlet assembly through a tire sidewall into air flow communication between the unobstructed air passageway and a tire cavity.

10. The method of claim 7, further comprising inserting a pre-cure temporary air inlet assembly into the air inlet cavity prior to curing the green tire carcass; and inserting a pre-cure temporary air outlet assembly into the air outlet cavity prior to curing the green tire carcass; and removing the temporary air inlet assembly and the temporary air outlet assembly after curing the green tire carcass.

11. The method of claim 1, wherein the fatty acid is selected from the group consisting of stearic acid, palmitic acid, oleic acid, linoleic acid, and linolenic acid, and mixtures thereof.

12. The method of claim 1, further comprising the step of overcoating the coating material with an elastomer layer.

13. The method of claim 12, wherein the step of overcoating the coating material comprises dipping the coated filament in an elastomer latex.

14. The method of claim 1, where in the amount of graphite ranges from 1 to 20 parts by weight.

15. The method of claim 1, wherein the amount of graphite ranges from 1 to 10.06 parts by weight.

16. The method of claim 1, wherein the amount of graphite ranges from 1 to 5.08 parts by weight.

17. The method of claim 1, wherein the amount of graphite ranges from 1 to 2.1 parts by weight.

* * * * *